United States Patent
Madhow et al.

(10) Patent No.: US 10,451,712 B1
(45) Date of Patent: Oct. 22, 2019

(54) RADAR DATA COLLECTION AND LABELING FOR MACHINE LEARNING

(71) Applicants: Upamanyu Madhow, Santa Barbara, CA (US); Mohammad Amin Arbabian, San Francisco, CA (US); Babak Mamandipoor, San Jose, CA (US); Hao Nan, Mountain View, CA (US)

(72) Inventors: Upamanyu Madhow, Santa Barbara, CA (US); Mohammad Amin Arbabian, San Francisco, CA (US); Babak Mamandipoor, San Jose, CA (US); Hao Nan, Mountain View, CA (US)

(73) Assignee: Plato Systems, Inc., San Mateo, CA (US)

( * ) Notice: Subject to any disclaimer, the term of this patent is extended or adjusted under 35 U.S.C. 154(b) by 0 days.

(21) Appl. No.: 16/298,791

(22) Filed: Mar. 11, 2019

(51) Int. Cl.
*G01S 7/41* (2006.01)
*G01S 13/72* (2006.01)
*G01S 13/86* (2006.01)

(52) U.S. Cl.
CPC ............ *G01S 7/417* (2013.01); *G01S 13/723* (2013.01); *G01S 13/867* (2013.01)

(58) Field of Classification Search
CPC ....... G01S 7/417; G01S 13/867; G01S 13/723
USPC .......................................................... 342/55
See application file for complete search history.

(56) References Cited

U.S. PATENT DOCUMENTS

| | | | | |
|---|---|---|---|---|
| 5,499,030 A | * | 3/1996 | Wicks | G01S 7/292 342/159 |
| 6,014,099 A | * | 1/2000 | Bennett | G01S 7/41 342/179 |
| 6,337,654 B1 | * | 1/2002 | Richardson | G01S 7/412 342/25 A |
| 7,386,373 B1 | * | 6/2008 | Chen | G01C 5/005 340/961 |
| 2010/0225531 A1 | * | 9/2010 | Johnson | G01S 13/90 342/25 A |
| 2011/0102234 A1 | * | 5/2011 | Adams | G01S 13/888 342/22 |
| 2012/0249363 A1 | * | 10/2012 | Kolinko | H01Q 19/175 342/179 |

* cited by examiner

*Primary Examiner* — Frank J McGue
(74) *Attorney, Agent, or Firm* — Schwegman Lundberg & Woessner, P.A.

(57) ABSTRACT

Systems and methods for labeling radar tracks for machine learning are disclosed. According to some aspects, a machine accesses data from radar unit(s), the data from the radar unit(s) comprising radar tracks, each radar track comprising one or more of the following: Doppler and micro-Doppler measurement(s), range measurement(s), and angle measurement(s). The machine accesses data from computer vision device(s), the data from the computer vision device(s) comprising image(s), the data from the computer vision device(s) being associated with a common geographic region and a common time period with the data from the radar unit(s). The machine labels, using an image recognition module, objects in the image(s). The machine determines, based on the common geographic region and the common time period, that labeled object(s) in the image(s) map to radar track(s). The machine labels the radar track(s) based on labels of the labeled objects.

20 Claims, 16 Drawing Sheets

RADAR DATA COLLECTION AND LABELING FOR MACHINE LEARNING

TECHNICAL FIELD

Embodiments pertain to radar processing systems and methods. Some embodiments relate to labeling radar tracks for machine learning.

BACKGROUND

Radar units output radar tracks that include range-Doppler silhouettes and micro-Doppler measurements. However, identifying objects represented by these measurements may be challenging.

SUMMARY

Figure 1:
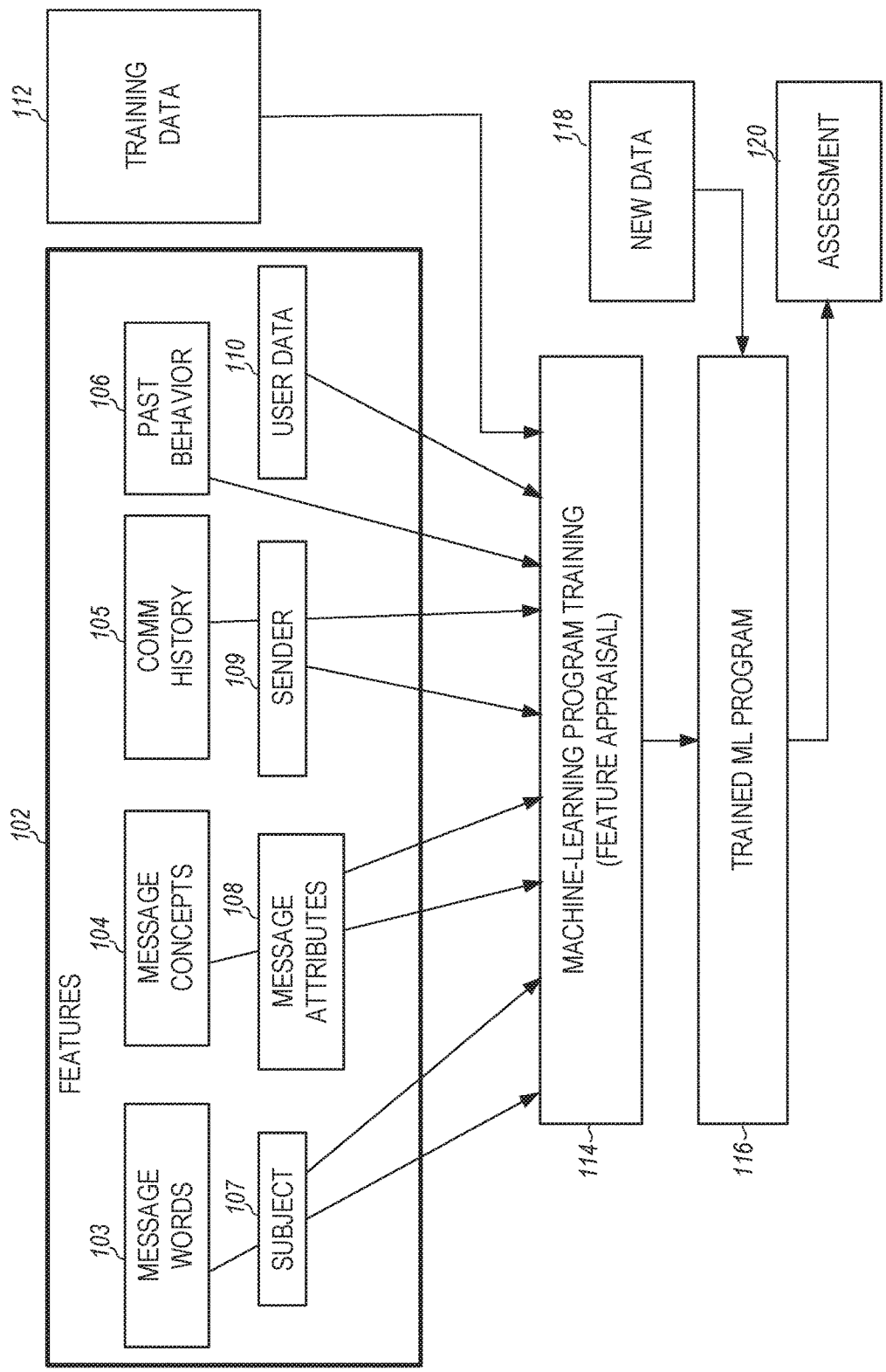
FIG. 1 illustrates the training and use of a machine-learning program, in accordance with some embodiments.

The present disclosure generally relates to machines configured to process radar data, including computerized variants of such special-purpose machines and improvements to such variants, and to the technologies by which such special-purpose machines become improved compared to other special-purpose machines that provide technology for processing radar data. In particular, the present disclosure addresses systems and methods for associating and labeling rich radar data with radar tracks for machine learning.

According to some aspects of the technology described herein, a system includes processing circuitry and memory. The processing circuitry accesses data from one or more radar units, the data from the one or more radar units comprising radar tracks, each radar track comprising one or more Doppler and/or micro-Doppler measurements, one or more range measurements, and one or more angle measurements. The processing circuitry accesses data from one or more computer vision devices, the data from the one or more computer vision devices comprising one or more images, the data from the one or more computer vision devices being associated with a common geographic region and a common time period with the data from the one or more radar units. The processing circuitry labels, using an image recognition module, objects in the one or more images from the one or more computer vision devices. The processing circuitry determines, based on the common geographic region and the common time period, that one or more labeled objects in the one or more images map to one or more radar tracks. The processing circuitry labels the one or more radar tracks based on labels of the labeled objects. The processing circuitry provides, as a digital transmission, the one or more labeled radar tracks.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, radar units output radar tracks that include range, Doppler, and/or micro-Doppler measurements. However, identifying objects represented by the Doppler measurements may be challenging. Some aspects of the technology described herein provide techniques for identifying objects represented by the Doppler measurements.

According to some schemes, representations of some common items (e.g., car, motorcycle, etc.), in terms of radar data, are collected and are stored in the memory of a computing machine. The computing machine then recognizes one of the common items by determining that an input radar data representation is similar to the stored representation. However, manually collecting and labeling many such stored representations may be tedious and expensive (in terms of human effort), and may not provide a diverse enough representation for reliable inference.

The technology described herein leverages machine learning to automatically identify object(s) in radar track(s) generated by radar unit(s). In some implementations, one or more radar units and one or more computer vision devices (e.g., cameras) are positioned to observe a common geographic region. A computing machine accesses data from the one or more radar units. The data from the one or more radar units comprises radar tracks, each radar track comprising one or more Doppler measurements, one or more range measurements, and one or more angle measurements. The computing machine accesses data from the one or more computer vision devices. The data from the one or more computer vision devices comprises one or more images. The data from the one or more computer vision devices is associated with the common geographic region and a common time period with the data from the one or more radar units. The computing machine labels, using an image recognition module, objects in the one or more images from the one or more computer vision devices. The computing machine determines, based on the common geographic region and the common time period, that one or more labeled objects in the one or more images map to one or more radar tracks. The computing machine labels the one or more radar tracks based on labels of the labeled objects. The computing machine provides, as a digital transmission, the one or more labeled radar tracks.

In some cases, the computing machine provides the one or more labeled radar tracks to a radar track recognition training module. The radar track recognition training module uses machine learning techniques (e.g., supervised learning) to train a radar track recognition module to recognize object(s) in radar track(s).

After it is trained, the radar track recognition module accesses data from one or more radar units. The data from the one or more radar units comprises radar tracks. Each radar track comprises one or more of at least one of the following: Doppler measurement(s), micro-Doppler measurement(s), range measurement(s), and angle measurement(s). The radar track recognition module determines a label representing one or more objects in the accessed data from the one or more radar units. The radar track recognition module provides, as a digital transmission, the determined label.

As used herein, the phrase "computing machine" encompasses its plain and ordinary meaning. A "computing machine" may include one or more computing machines. A computing machine may include one or more of a server, a data repository, a client device, and the like. A client device may include a laptop computer, a desktop computer, a mobile phone, a smart watch, a tablet computer, a smart television, a personal digital assistant, a digital music player, and the like. A computing machine may be any device or set of devices that, alone or in combination, includes processing circuitry and memory.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised, indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model, satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

Figure 2:
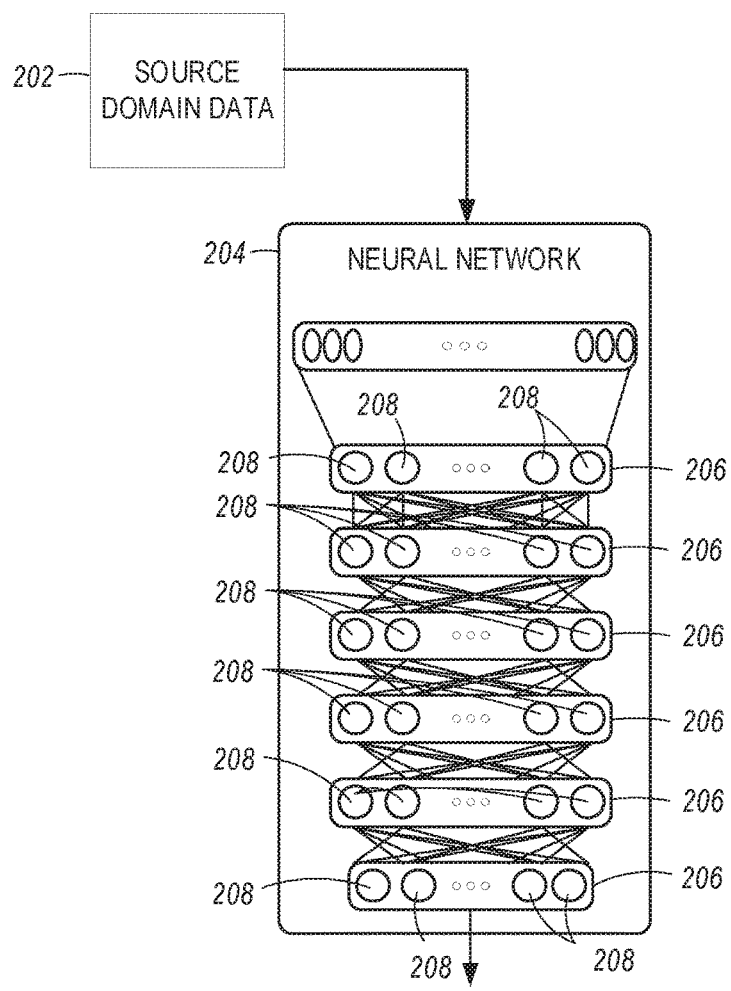
FIG. 2 illustrates an example neural network, in accordance with some embodiments.
Figure 2:
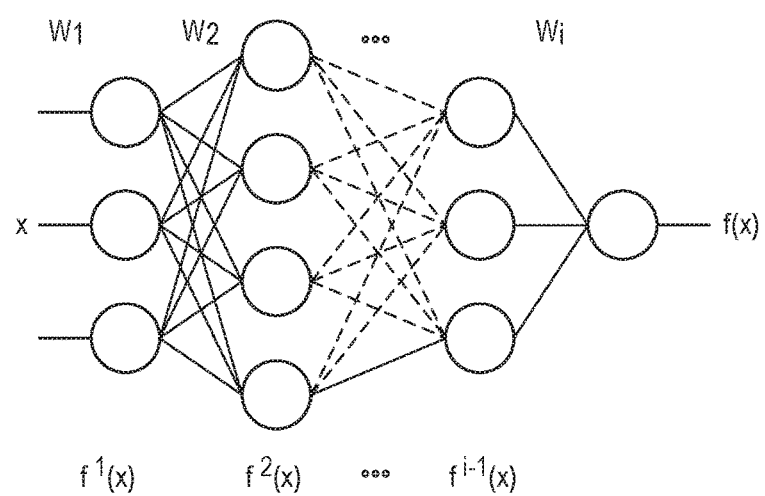

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer 206 and apply weights to the values received from those neurons 208 in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1$, $W_2$, . . . , $W_i$ are applied to the input to each layer to arrive at $f^1(x)$, $f^2(x)$, . . . , $f^{i-1}(x)$, until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein is configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
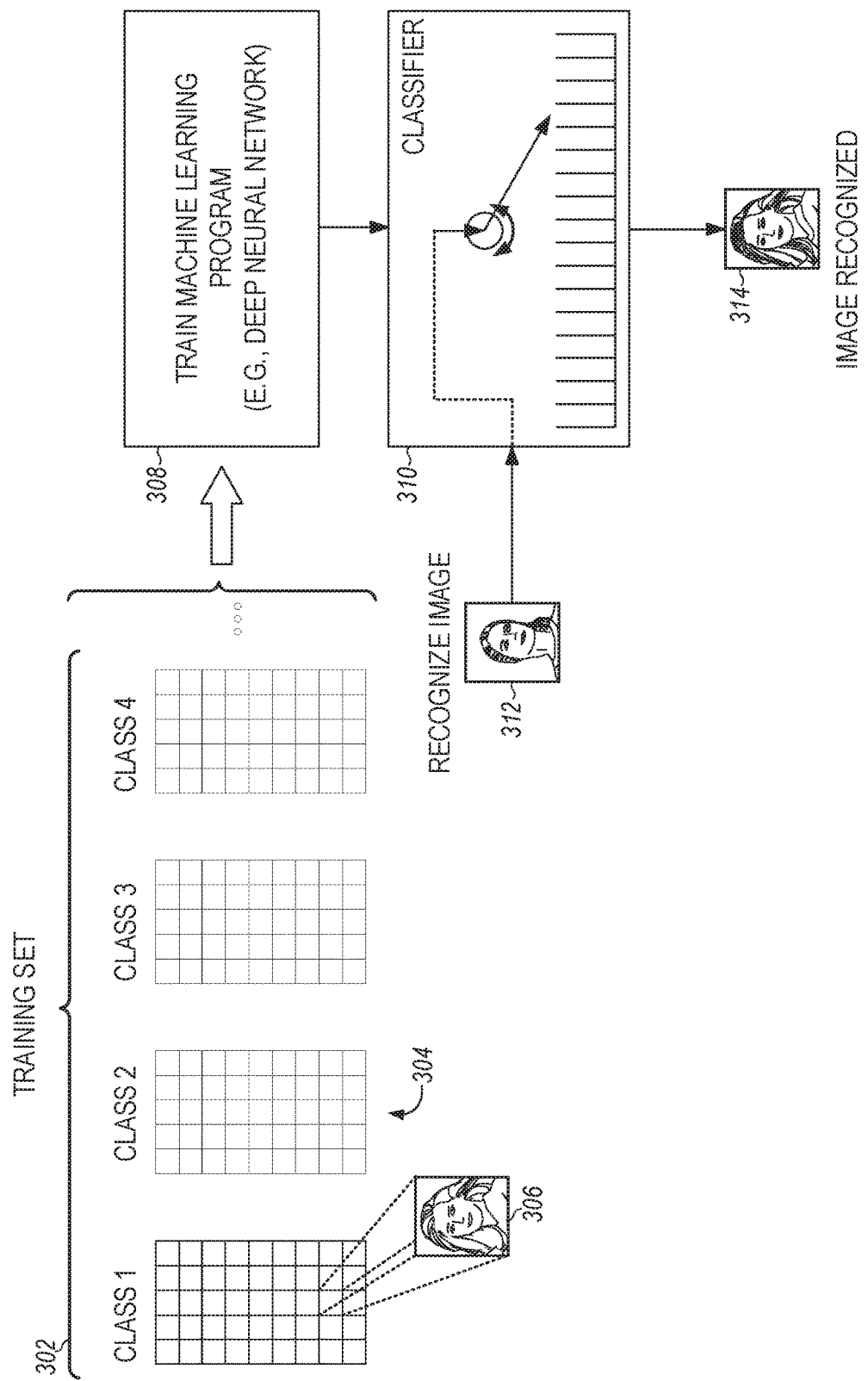
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. As shown, training set 302 includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. The trained classifier 310, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained at block 308 with the training data to generate a classifier at block 310 operable to recognize images. In some example embodiments, the machine learning program is a DNN.

When an input image 312 is to be recognized, the classifier 310 analyzes the input image 312 to identify the class corresponding to the input image 312. This class is labeled in the recognized image at block 314.

Figure 4:
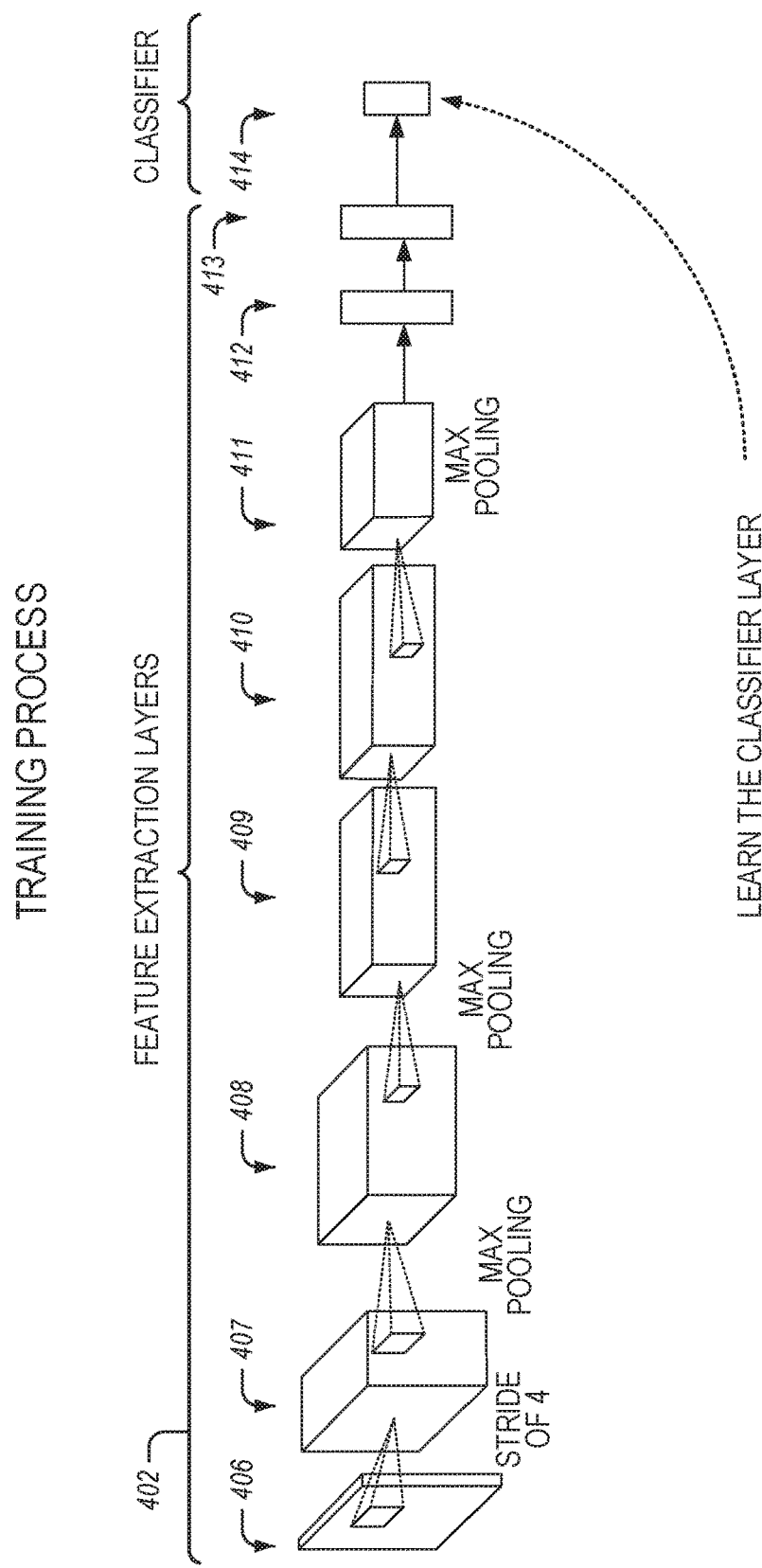
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has often been used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as by reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right as the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
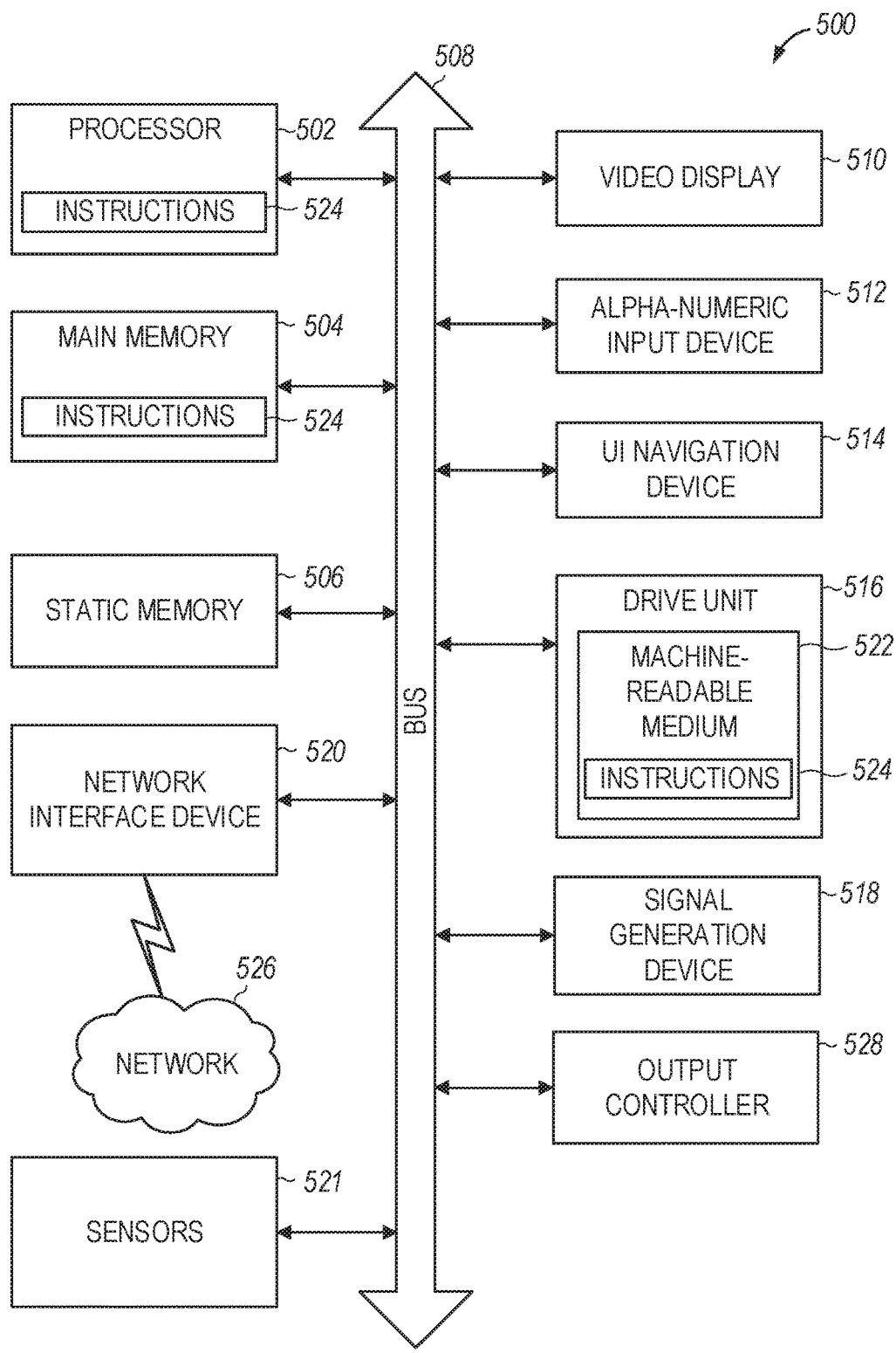
FIG. 5 is a block diagram of a computing machine, in accordance with some embodiments.

FIG. 5 illustrates a block diagram of a computing machine 500 in accordance with some embodiments. In some embodiments, the computing machine 500 may store the components shown in the circuit block diagram of FIG. 5. For example, circuitry that resides in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory, or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518

(e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Figure 6:
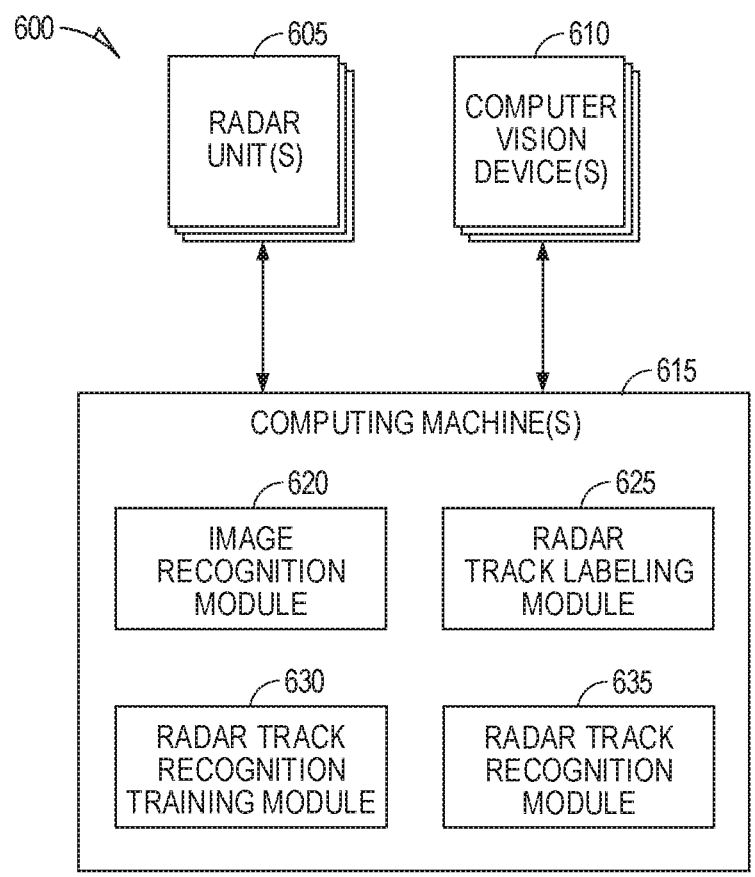
FIG. 6 illustrates an example system in which labeling radar tracks for machine learning may be implemented, in accordance with some embodiments.

FIG. 6 illustrates an example system 600 in which labeling radar tracks for machine learning may be implemented, in accordance with some embodiments. As shown, the system 600 includes computing machine(s) 615 coupled with radar unit(s) 605 and computer vision device(s) 610. The radar unit(s) 605 and some components of the computing machine 615 may be referred to as the "radar system." The computer vision device(s) 610 and some components of the computing machine 615 may be referred to as the "computer vision system."

The radar unit(s) 605 may include Multiple Input Multiple Output (MIMO) unit(s). The radar unit(s) 605 output, to the computing machine 615, radar data, which includes radar track(s). Each radar track includes one or more of at least one of the following: Doppler measurement(s), micro-Doppler measurement(s), range measurement(s), and angle measurement(s). The computer vision device(s) 610 may include cameras. The computer vision device(s) 610 provide, to the computing machine 615, image data. The radar unit(s) 605 and the computer vision device(s) 610 may provide data that is associated with a common geographic region (e.g., a football field-sized region that is observed by both the computer vision device(s) 610 and the radar unit(s) 605) and a common time period (e.g., within the same second, 10 seconds, minute, etc.). In some cases, the radar unit(s) 605 observe a first geographic area, the computer vision device(s) 610 observe a second geographic area, and the first geographic area intersects with the second geographic area.

The computing machine 615 may correspond to the computing machine 500 of FIG. 5. As shown, the computing machine 615 includes an image recognition module 620, a radar track labeling module 625, a radar track recognition training module 630, and a radar track recognition module 635. The modules 620-635 may be implemented in software stored in memory, in hardware hard-wired into the processing circuitry, or in a combination of software and hardware.

The image recognition module 620 is a trained module that receives, as input, an image and generates one or more labels of object(s) in the image. Examples of labels may be "person," "dog," "cat," [5] [GR6] "car," "bicycle," and the like. The image recognition module 620 may, in some examples, have been trained as shown in FIG. 3. The image recognition module 620 labels objects in one or more images received, at the computing machine(s) 615, from the computer vision device(s) 610. The image recognition module 620 may implement any image recognition technology. For example, the image recognition module 620 may be implemented using open source technologies, such as YOLO or SSD. [GR7]

The radar track labeling module 625 determines, based on the common geographic region (e.g., overlapping geographic regions) and the common time period (e.g., less than a threshold time difference, such as 10 seconds, 30 seconds, 60 seconds, etc.) of received data from the radar unit(s) 605 and the computer vision device(s) 610, that one or more labeled objects in the one or more images from the computer vision device(s) 610 map to one or more radar tracks from the radar unit(s) 605. The radar track labeling module 625 labels the one or more radar tracks based on the labeled objects in the image(s) in the received data from the computer vision system(s) 610. The radar track labeling module 625 provides (e.g., as a digital transmission) the one or more labeled radar tracks (e.g., to the radar track recognition training module 630).

The radar track recognition training module 630 uses machine learning techniques to train the radar track recognition module 635 to recognize object(s) in radar track(s). Any machine learning technique can be used. In some examples, supervised learning is used. In alternative examples, unsupervised learning or reinforcement learning could be used.

After it is trained, the radar track recognition module 635 accesses data from the radar unit(s) 605. This accessed data might, in some cases, not be coupled with data from the computer vision device(s) 610. The data from the radar unit(s) 610 includes radar tracks. The radar track recognition module 635 determines a label representing one or more objects in the accessed data from the one or more radar units (as it has been trained to do using the radar track recognition training module 630). The radar track recognition module 635 provides (e.g., as a digital transmission) the determined label.

As shown, the modules 620-635 reside on the same computing machine(s) 615. However, in some embodiments, each module 620, 625, 630, and 635 may reside on its own machine or two or three modules may share a common machine, and other modules may reside on other machine(s). If there are multiple computing machines 615, the multiple machines may be connected to one another via a network or via a direct wired or wireless connection. More details of the operations of the computing machine(s) 615 and the modules 620-635 are provided in conjunction with FIGS. 7-8.

Figure 7:
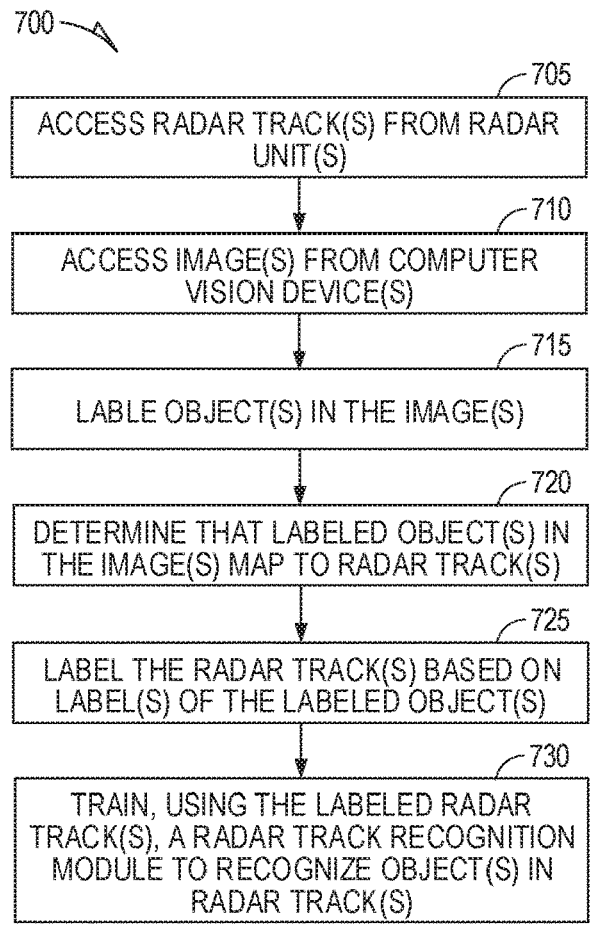
FIG. 7 is a flow chart of a method for labeling radar tracks for machine learning, in accordance with some embodiments.

FIG. 7 is a flow chart of a method 700 for labeling radar tracks for machine learning, in accordance with some embodiments.

At operation 705, a computing machine (e.g., computing machine 615 or 500) accesses radar track(s) from radar unit(s) (e.g., radar unit(s) 605). Each radar track includes one or more Doppler measurements, one or more range measurements, and one or more angle measurements. The one or more angle measurements may be two-dimensional angles (e.g., degrees counterclockwise from the positive direction on the x-axis or degrees clockwise from north) or three-dimensional (3D) angles. A three-dimensional angle may be represented as a combination of two two-dimensional angles (e.g., an angle in the XY-plane and angle in the XZ-plane or a first angle in the XY-plane and a second angle in a plane that is normal to the XY-plane and includes a ray corresponding to the first angle in the XY-plane). In some cases, at least a portion of the radar track(s) include a micro-Doppler measurement. In some cases, the one or more Doppler measurements are in 3D, the one or more range measurements are in 3D, and the one or more angle measurements correspond to 3D spherical coordinates. In some cases, the one or more Doppler measurements are in two-dimensions (2D), the one or more range measurements are in 2D, and the one or more angle measurements correspond to 2D coordinates.

At operation 710, the computing machine accesses image(s) from computer vision device(s) (e.g., computer vision device(s) 610). The radar track(s) and the image(s) may be associated with a common geographic region and a common time period. The common geographic region may be an overlapping geographic region, and the common time period may be an overlapping time period. The common time period may refer to the image(s) from the one or more computer vision devices being generated within a threshold amount of time from the radar track(s) from the radar unit(s). The common geographic region may refer to the image(s) from the one or more computer vision devices being generated within a threshold distance from the radar track(s) from the radar unit(s).

At operation 715, the computing machine labels (e.g., using image recognition module 620) objects in the image(s) from the computer vision device(s). Any image recognition technique could be used.

At operation 720, the computing machine determines, based on the common geographic region and the common time period, that the labeled object(s) in the image(s) map to the radar track(s). In some cases, the computing machine may make a determination that the labeled object(s) moved from a first position at a first moment in time that is associated with the one or more radar tracks to a second position at a second moment in time that is associated with the one or more images, or vice versa. In response to this determination, the computing machine propagates a label of the labeled object(s) associated with the second geographic position at the second time moment to the radar track(s) at the first geographic position at the first time moment. The propagating may include back-propagating or forward-propagating.

At operation 725, the computing machine labels the radar track(s) based on label(s) of the labeled object(s) in the image(s).

In some examples, the computing machine determines, at a first time, that two or more objects correspond to a single radar track based on a geographic position of the single radar track and geographic positions of the two or more objects. For example, a radar track may occupy a geography/time region that is occupied, in the image(s), by both a human and a dog. The computing machine provides a single label (e.g., "human and dog") for the two or more objects based on the two or more objects corresponding to the single radar track. In some examples, the radar unit(s) may be unable to distinguish between signals from a first object and a second object. However, the computer vision device(s) may be able to distinguish between the first object and the second object. The first object and the second object are both from among the two or more objects, and the radar unit(s) track the two or more objects over time.

In some cases, the computing machine detects, at a second time different from the first time, via the computer vision device(s) or the image recognition module, that the first object and the second object correspond to two distinct radar tracks. The computing machine then assigns two separate labels to the first object and the second object. The computing machine propagates (e.g., forward-propagates or back-propagates) the assigned two separate labels to distinguish between a radar track of the first object and a radar track of the second object. In some cases, either: (i) the second time is later than the first time and the propagating includes back-propagating or (ii) the second time is earlier than the first time and the propagating includes forward-propagating.

The computing machine may provide, as a digital transmission, the labeled radar track(s). The labeled radar track(s) may be provided, for example, to another machine for further processing, to a data repository for storage, and/or to a client device for display. If forward-propagation or back-propagation is implemented, the digital transmission may include the propagated label of the labeled object(s) in the image(s) or the radar track(s). If a single label represents a single object or multiple objects, the digital transmission may include the single label.

In some cases, labeling the radar track(s) includes assigning a single deterministic label to a single object corresponding to the radar track(s). In some cases, labeling the radar track(s) includes assigning a single deterministic label to a combination of two or more objects corresponding to the radar track(s). In some cases, labeling the radar track(s) includes assigning, to a single object or a combination of two or more objects corresponding to the radar track(s), a combination of two or more labels, each of the two or more labels having an associated probability value. In some cases, labeling the radar track(s) includes applying label smoothing or label correction based on a path of an object detected by the one or more computer vision devices and the one or more radar units, wherein the label smoothing or the label correction averages labels across the path.

At operation 730, the computing machine trains, using the labeled radar track(s), a radar track recognition module (e.g., residing at the computing machine or at another machine) to recognize object(s) in radar tracks(s). After operation 730, the method 700 ends.

Figure 8:
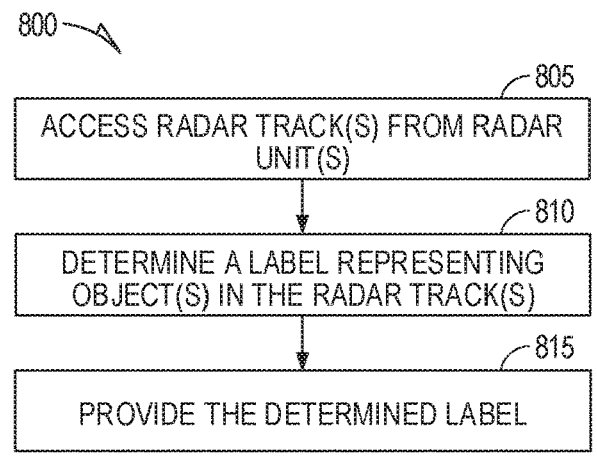
FIG. 8 is a flow chart of a method for identifying object(s) in radar track(s), in accordance with some embodiments.

FIG. 8 is a flow chart of a method 800 for identifying object(s) in radar track(s), in accordance with some embodiments.

At operation 805, a computing machine (e.g., computing machine 615 or 500) accesses radar track(s) from radar unit(s) (e.g., radar unit(s) 605). Each radar track includes one or more 2D or 3D Doppler measurements, one or more 2D or 3D range measurements, and one or more 2D or 3D angle measurements.

At operation 810, the computing machine determines, using a machine learning-trained module (e.g., radar track recognition module 635, which is trained by radar track recognition training module 630), a label representing object(s) in the radar track(s). The machine learning-trained module is trained based on a dataset of labeled data tracks (e.g., using the method 700 of FIG. 7). In some cases, the dataset of labeled radar tracks is labeled based on labels of images. The images and the labeled radar tracks are associated with a common geographic region and a common time period. In some cases, the determined label is a single label that corresponds to a single radar track and multiple objects (e.g., a human and a dog).

At operation 815, the computing machine provides, as a digital transmission, the determined label. For example, the label may be output to a display unit or provided for further processing. The further processing may include processing associated with securing a geographic location from intruders, operating an autonomous vehicle, patrolling vehicle speeds on a highway, generating an electronic message that includes the determined label, and the like. After operation 815, the method 800 ends.

Figure 9:
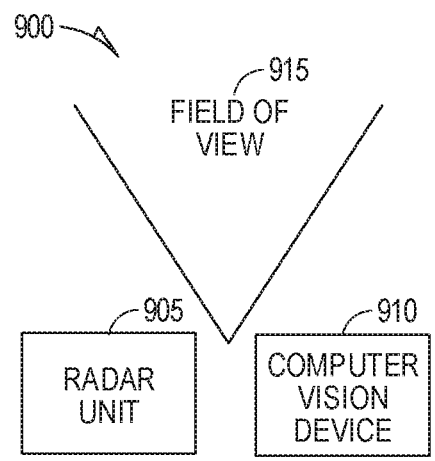
FIG. 9 illustrates an example field of view of a radar unit and a computer vision device, in accordance with some embodiments.

FIG. 9 illustrates an example system 900 that includes a field of view 915 of a radar unit 905 and a computer vision device 910, in accordance with some embodiments. As shown, both the radar unit 905 and the computer vision device 910 observe the field of view 915 at the same time.

Figure 10:
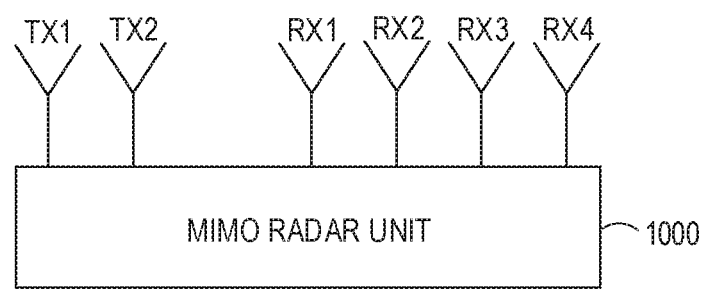
FIG. 10 illustrates an example Multiple Input Multiple Output (MIMO) radar unit, in accordance with some embodiments.

FIG. 10 illustrates an example MIMO radar unit 1000, in accordance with some embodiments. As shown, the MIMO radar unit 1000 includes two transmit antennas: TX1 and TX2, and four receive antennas: RX1, RX2, RX3, and RX4.

Figure 11:
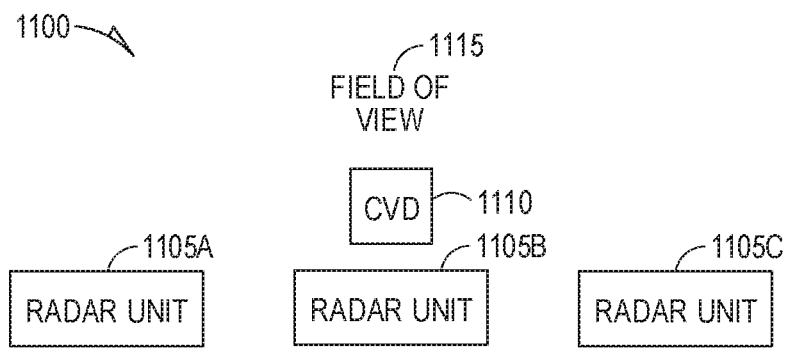
FIG. 11 illustrates a first radar unit and computer vision device configuration, in accordance with some embodiments.

FIG. 11 illustrates a first radar unit and computer vision device configuration 1100, in accordance with some embodiments. As shown in the configuration 1100, three radar units 1105A, 1105B, and 1105C are arranged along a straight line, with the middle radar unit 1105B being coupled with a computer vision device (CVD) 1110. The CVD 1110 and the radar units 1105A, 1105B, and 1105C observe the field of view 1115.

Figure 12:
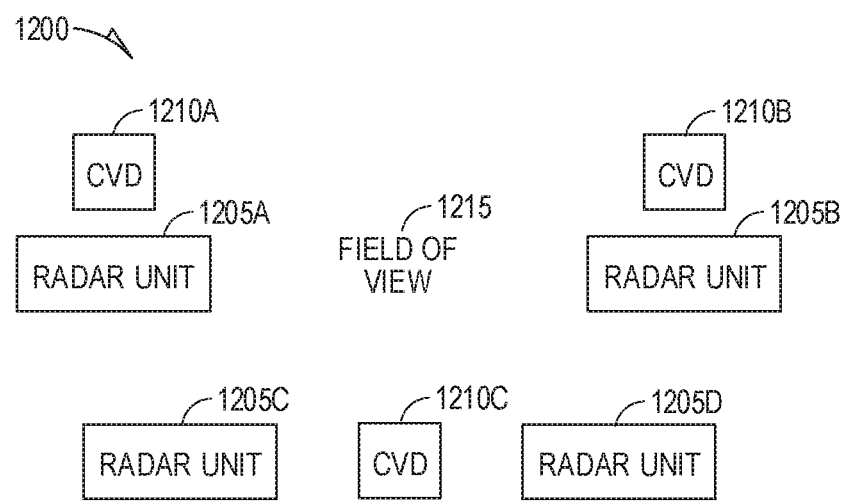
FIG. 12 illustrates a second radar unit and computer vision device configuration, in accordance with some embodiments.

FIG. 12 illustrates a second radar unit and computer vision device configuration 1200, in accordance with some embodiments. In the configuration 1200, four radar units 1205A, 1205B, 1205C, and 1205D, and three CVDs 1210A, 1210B, and 1210C, are arranged along three sides of a rectangle. The first side includes radar unit 1205A and CVD 1210A. The second side includes radar units 1205C and 1205D and CVD 1210C. The third side includes CVD 1210B and radar unit 1205B. The field of view 1215 corresponds to the interior of the rectangle.

Figure 13:
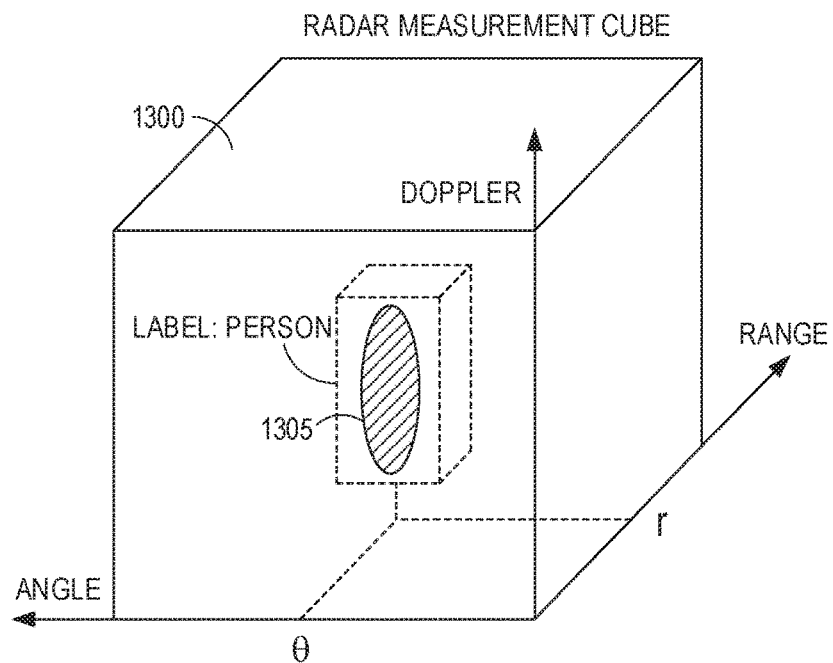
FIG. 13 illustrates an example target in a radar data cube, in accordance with some embodiments.

FIG. 13 illustrates an example target 1305 in a radar data cube 1300, in accordance with some embodiments. As shown, the radar data cube 1300 has sides that correspond to Doppler, range, and angle axes. The target 1305 occupies a space defined by these axes. It should be noted that the range and angle can be computed by one or more computer vision devices in order to identify object(s) corresponding to the target 1305.

Figure 14:
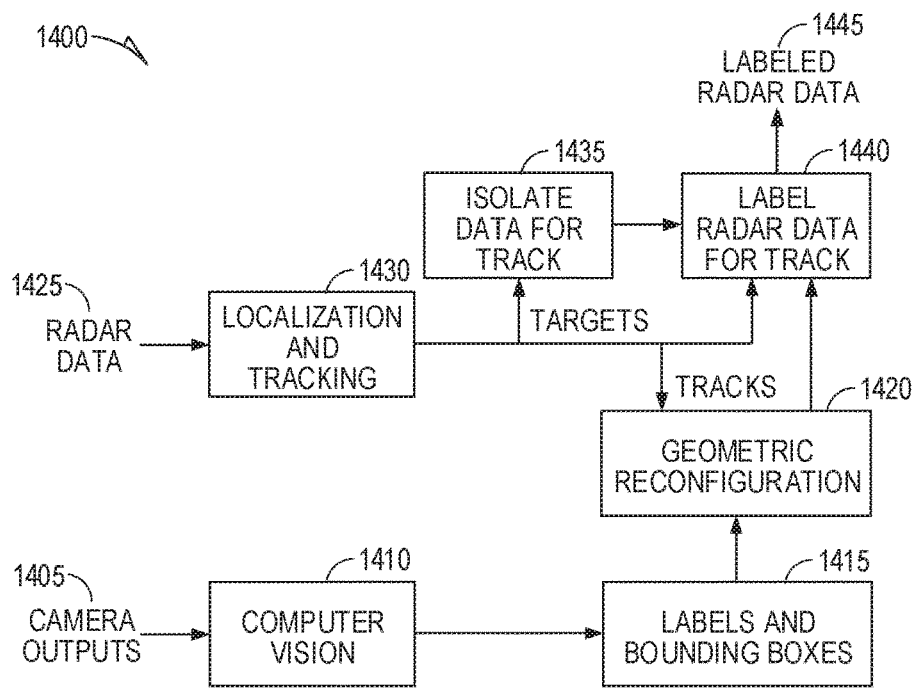
FIG. 14 illustrates an example labeling architecture, in accordance with some embodiments.

FIG. 14 illustrates an example labeling architecture 1400, in accordance with some embodiments. As shown in FIG. 14, camera outputs 1405 are provided to a computer vision module 1410. The computer vision module 1410 produces labels and bounding boxes 1415 in image(s). These labels and bounding boxes 1415 are provided to a geometric reconfiguration module 1420.

Meanwhile, radar data 1425 is provided to localization and tracking module 1430. The localization and tracking module 1430 provides targets to isolate data for track module 1435 and provides tracks to the geometric reconfiguration module 1420. The data for the tracks from the isolate data for track module 1435 and the geometric reconfiguration from the geometric reconfiguration module 1420 are provided to the label radar data for track module 1440. The label radar data for track module 1440 generates labeled radar data 1445.

Figure 15:
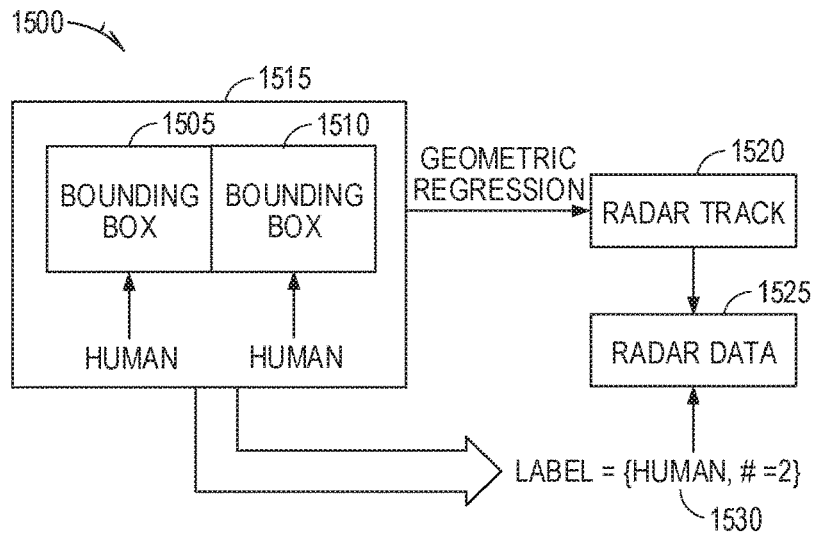
FIG. 15 illustrates an example of labeling multiple objects, in accordance with some embodiments.

FIG. 15 illustrates an example data flow diagram 1500 of labeling multiple objects, in accordance with some embodiments. As shown, computer vision device(s) detect an image 1515. Within the image 1515, a computing machine identifies two adjacent bounding boxes 1505 and 1510 that represent humans. A geometric regression is used to identify a single radar track 1520 that corresponds to the two bounding boxes 1505 and 1510. Therefore, a single label 1530 for the two humans is generated. The label 1530 is (human, #=2). This label 1530 is stored, along with the radar track 1520, in the radar data 1525.

Figure 16:
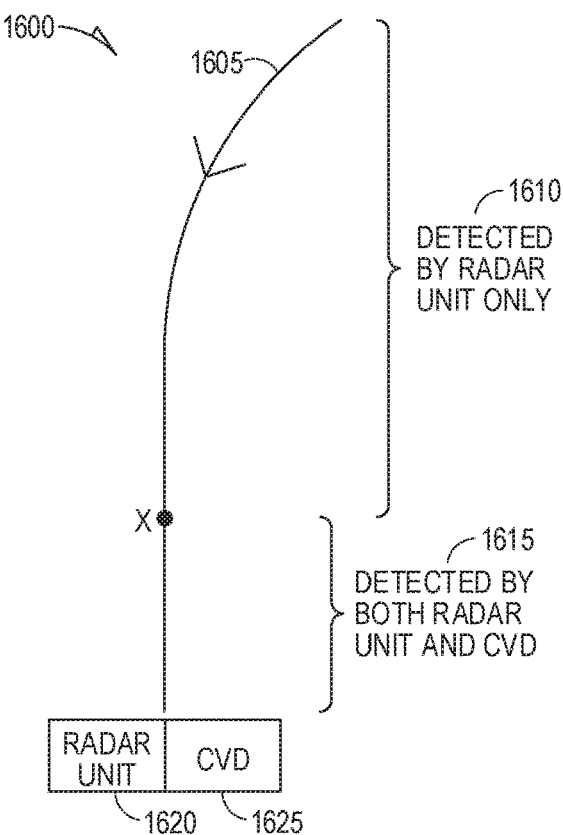
FIG. 16 illustrates an example of labeling an object traveling along a trajectory, in accordance with some embodiments.

FIG. 16 illustrates an example diagram 1600 of labeling an object traveling along a trajectory 1605, in accordance with some embodiments. As shown, the diagram 1600 includes a radar unit 1620 and a CVD 1625. In the first part 1610 of the trajectory 1605, the traveling object is detected by the radar unit 1620, and not by the CVD 1625. After passing point X and beginning the second part 1615 of the trajectory 1605, the traveling object is detected by both the radar unit 1620 and the CVD 1625. When the CVD 1625 detects the traveling object, the traveling object is labeled (e.g., as a car, a motorcycle, a truck, and/or the like) and the label is back-propagated to the first part 1610 of the trajectory 1605. Therefore, the radar track associated with the first part 1610 of the trajectory will be labeled, even though the CVD 1625 was not able to detect the traveling object when the traveling object was in the first part 1610 of the trajectory 1605. The labeling technique of FIG. 16 may be referred to as "noncausal labeling."

Figure 17:
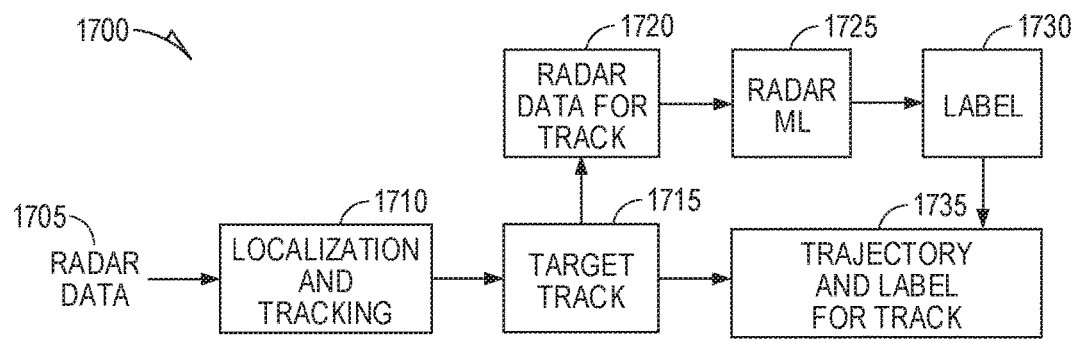
FIG. 17 illustrates an example radar machine learning system, in accordance with some embodiments.

FIG. 17 illustrates an example radar machine learning system 1700, in accordance with some embodiments. As shown, in the system 1700, radar data 1705 is provided to a localization and tracking module 1710, which generates a target track 1715. The target track 1715 is processed to generate radar data 1720 for the track. The radar data 1720 is provided to a radar machine learning (ML) module 1725 (e.g., radar track recognition module 635), which generates a label 1730 for the radar track. The label 1730 is combined with the target track 1715 to generate a trajectory and label combination 1735 for the track. The system 1700 outputs the trajectory and label combination 1735 for the object(s) in the radar data 1705, independent of other sensing modalities. Other sensing modalities might or might not be coupled with the system 1700.

Figure 18:
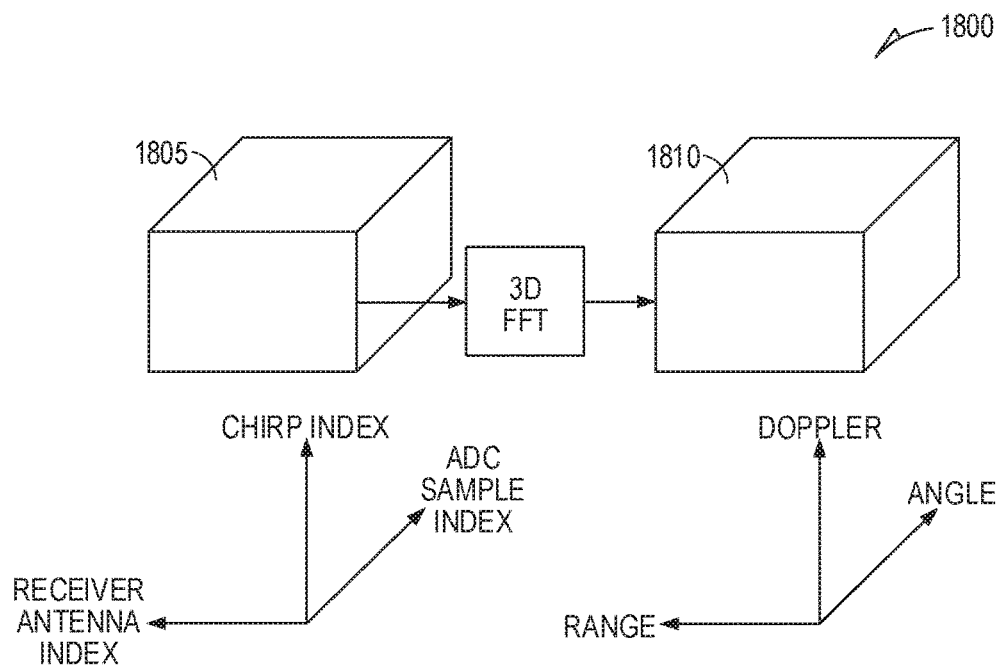
FIG. 18 illustrates an example three-dimensional Fast Fourier Transform applied to radar data, in accordance with some embodiments.

FIG. 18 illustrates an example three-dimensional Fast Fourier Transform (FFT) 1800 applied to radar data, in accordance with some embodiments. As shown, block 1805 has the axes ADC sample index, chirp index, and receiver antenna index. A 3D FFT is applied to block 1805 to yield block 1810. Block 1810 has the axes angle, Doppler, and range.

Standard radar processing estimates the ranges and Doppler frequencies of targets, and the output of multiple cooperating radar units can be used to estimate and track the positions and velocities of targets. Valuable information regarding the class of a target is contained in range and Doppler information. For example, the size of the target, and its distance from the radar units, may determine the pattern of range bins corresponding to the target. The Doppler information may also carry information regarding the type of target (e.g., a rider on a bike typically moves faster than a pedestrian). In addition, valuable information regarding the type of target is contained in micro-Doppler patterns corresponding to the target. In some cases, as described herein, radar information can be used to identify a target in place of or in addition to visual information.

Figure 20:
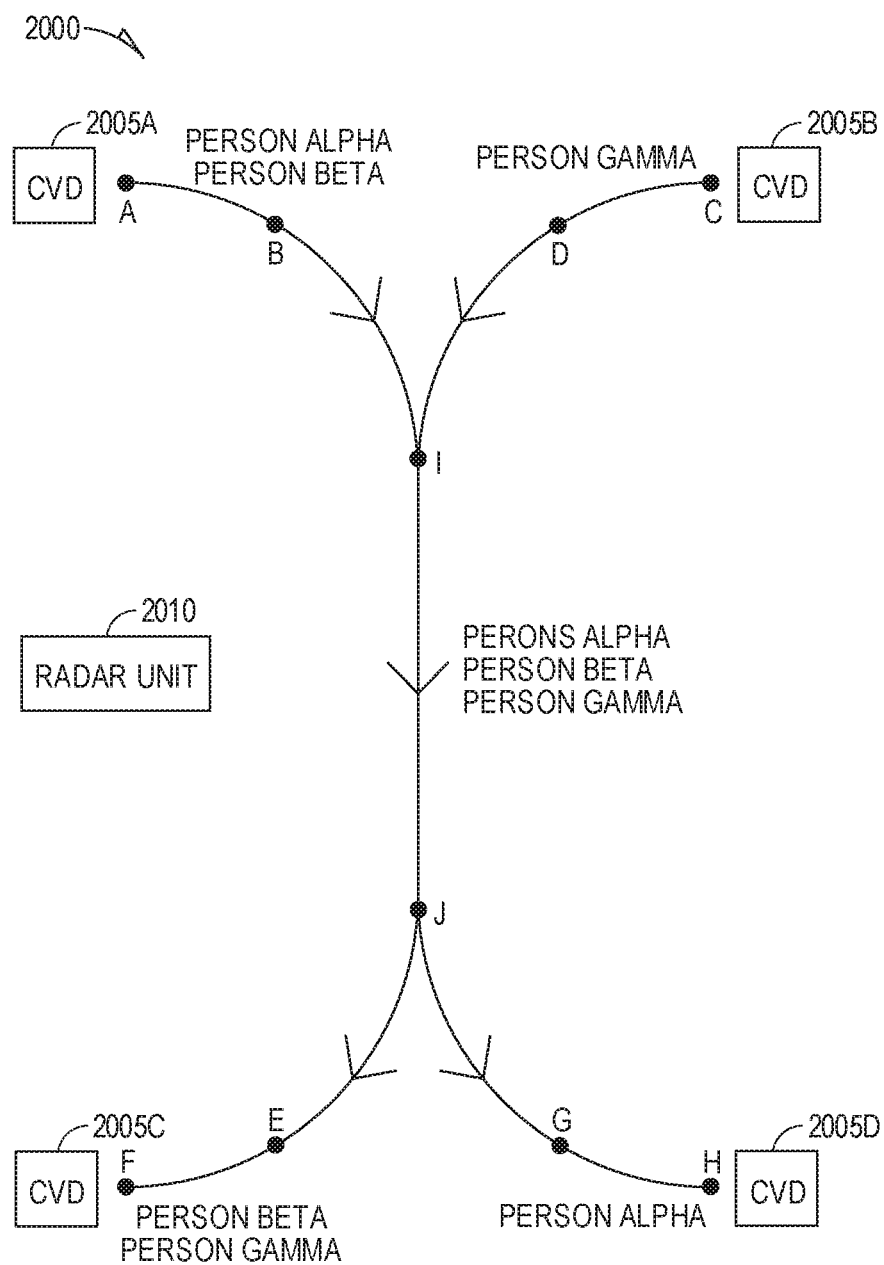
FIG. 20 illustrates an example of labeling multiple objects traveling along a trajectory, in accordance with some embodiments.

FIG. 20 illustrates an example of label transfer 2000, in accordance with some embodiments. As shown, a CVD measurement 2005 detects an object 2020 within range r and angle θ from a predefined location and ray (e.g., the location of the CVD and a ray directed northward from the CVD). This object 2020 is assigned the label "human" using an image recognition technique. A radar measurement 2010 detects a signal 2015, which may comprise a range-Doppler pattern, which may be termed a range-Doppler silhouette, as well as associated micro-Doppler measurements, at range r and angle θ. The radar-based signal 2015 is transferred the label "human" from the object 2020 due to their having the common range r and the common angle θ.

As shown in FIG. 20, the CVD detects an object at range r and angle θ with respect to its own frame of reference at time t. This is converted to an approximate object geographic location in a global reference frame. The computing machine assigns the label "human" to the detected object 2020. The radar system takes labels generated by the vision system and assigns those labels to radar tracks at approximately the same geographic location and time. The radar track(s) corresponding to the trajectory that includes the geographic location and time detected from the vision system are saved, and the label "human" is assigned to those radar track(s).

Some applications are directed to classifying the type of object detected by a radar system. For example, a radar system deployed on an automobile may want to classify objects that it detects into persons, bicycles, dogs, automobiles, trucks, and so on. A radar system deployed for security might have similar objectives (e.g., it may wish to distinguish between a person and a small animal), and may require additional functionalities, such as determining information regarding the identity of a person being detected.

In principle, if there were a mathematical model for radar data (range, angle, Doppler, micro-Doppler) that captures the statistical distribution of the data conditioned on each class of interest, then it becomes possible to apply classical hypothesis testing principles to devise decision rules for classification. In general, however, such mathematical models are difficult to develop. For example, different humans walk differently, and the radar data they generate is a complex function of their actions, what they are wearing or carrying, the variation of the radar cross section, and the propagation environment. Even for the same person, the radar information can be different depending on the behavior, such as running, walking, jogging, holding a briefcase, wearing a backpack, and the like.

Thus, it becomes attractive to consider classification strategies that are learned from data. State of the art classification solutions using optical images are based on machine learning, typically using deep neural networks (DNNs). These DNNs are trained using a large amount of labeled data. Labeling is a time-consuming manual process, but can be effectively performed by humans. There now exist large publicly available labeled image databases, such as ImageNet and CiFAR. A large number of pre-trained DNNs for classification are also publicly available, such as GoogleNet and VGG. Building on DNNs originally developed for classification, there are also open source DNNs, such as YOLO and SSD, that draw bounding boxes around salient objects, and classify them. These DNNs are trained on labeled images in which humans have drawn bounding boxes around labeled objects. DNNs can also be used in computer vision systems that include both cameras and Lidar.

In contrast, radar data is not easily interpreted by a human looking at the data in general. While it is possible to develop a user interface which allows a human to discern a moving object after appropriate radar processing, it is difficult for a human to label the object (e.g., human versus dog). More importantly, while humans can naturally draw bounding boxes around salient objects in an image and label them, it is not possible to draw similar bounding boxes around radar data. As one example, we may have a three-dimensional radar data cube in a multi-antenna radar system, in which an object may lie in a set of range-Doppler-angle bins. In addition, we may have micro-Doppler data gathered for that object. The data might be gathered by multiple radar sensors, each having a different view of the object. The data is complex-valued, and does not always have a natural visualization. Devising a user interface for humans to label such data is therefore difficult.

Some aspects of the technology disclosed herein employ a radar system and a computer vision system in concert (see, for example, FIG. 9). One or more cameras are employed to view the same scene as the radar system. The computer vision device(s) (e.g., CVD(s) 610, 910, 1110, 1210A-C, 1625, and 2005A-D) may also include one or more Lidar sensors, which actively emit optical frequencies and process the returns. In some aspects, the radar and computer vision systems are geometrically co-registered: the vision system may be calibrated, and may be able to estimate the 3D coordinates of objects appearing in the scene, and may have the same 3D frame of reference as the radar system. The radar system may consist of one or more radar units (e.g., radar unit(s) 605, 905, 1000, 1105A-C, 1205A-D, 1620, and 2010), with each radar unit employing techniques such as MIMO radar, as shown in FIG. 10. Example configurations of the radar units and cameras are shown in FIGS. 11-12.

The computer vision system, which may be based on a DNN, detects objects, draws bounding boxes around them, and classifies the detected objects. These bounding boxes are typically 2D and based on the image sensor, but can have depth information from stereo image sensors. Depth information can also be obtained from Lidar sensors. The radar system uses these labels for the radar data corresponding to the geometric region indicated by the vision system. This radar data includes range bins and angular bins associated with this geometric region, and the Doppler bins and micro-Doppler patterns corresponding to these range and angle bins. This procedure is used to build up a database of labeled radar data, which is then used to train machine learning algorithms for object detection and classification using radar data alone.

Both the computer vision system and the radar system may use any known (or disclosed herein) techniques to detect and track objects. Tracking may include, among other things, the process of assigning a location as a function of time to an object. The time series of locations for a tracked object is termed a trajectory. The computer vision device(s) may include a single camera or a network of cameras. The radar unit(s) may include a single radar unit or a network of collaborating radar units. The computer vision device(s) and the radar unit(s) may operate their tracking algorithms independently, but with a common geographic frame of reference and a common time base for estimating the trajectories of tracked objects. When the computer vision device(s) assign a label to an object that they have detected, the approximate location and time at which the object is detected is used to map the label to a trajectory for the radar unit(s).

Radar tracking may be accomplished over a longer range than tracking based on computer vision. When multiple objects are in close proximity and cannot be resolved by the radar system, a radar tracker may estimate a single trajectory for them, especially if the objects are following paths which remain close to each other. However, at shorter ranges, computer vision may be able to resolve objects that a radar tracker cannot. This is because optical wavelengths are much smaller than radio frequency wavelengths.

Radar data can be obtained using a variety of transmitted waveforms. A common waveform is a sequence of chirps. Another common waveform is a sequence of short pulses. Yet another waveform is direct sequence spread spectrum signaling. The generation of range and Doppler from processing the returns from such waveforms are described below in one example. Consider a radar unit with one transmit antenna and a linear array of multiple receive antennas. The transmit antenna sends a sequence of chirps in a burst, also called a frame. The backscattered data is received by the receive antennas, down-converted (typically by mixing against the transmitted chirp waveform), filtered, sampled and converted to digital format using analog-to-digital converters. As illustrated in block 1905 of FIG. 18, this received data has three dimensions: ADC samples per chirp ("fast time"), chirp index within a frame ("slow time"), and receive antenna element. As shown in FIG. 18, this can then be converted to range-Doppler-angle space (block 1810) by taking a 3D FFT. The FFT in fast time produces range bins, the FFT across slow time produces Doppler bins, and the FFT across receive elements produces angle bins. Some aspects operate in such a transform domain, since it provides a geometric interpretation of the collected data.

While the Doppler measurements correspond to bulk motion of the target, parts of the target may move in a manner that modulates the frequencies of the returns from the target in a time-varying fashion (e.g., due to the arm and leg motion of a human). The resulting micro-Doppler patterns can be captured by, for example, taking a short time Fourier transform across the relevant range bins over time. Once a target is detected and tracked, the micro-Doppler data corresponding to it is also stored by the computing machine(s).

Figure 19:
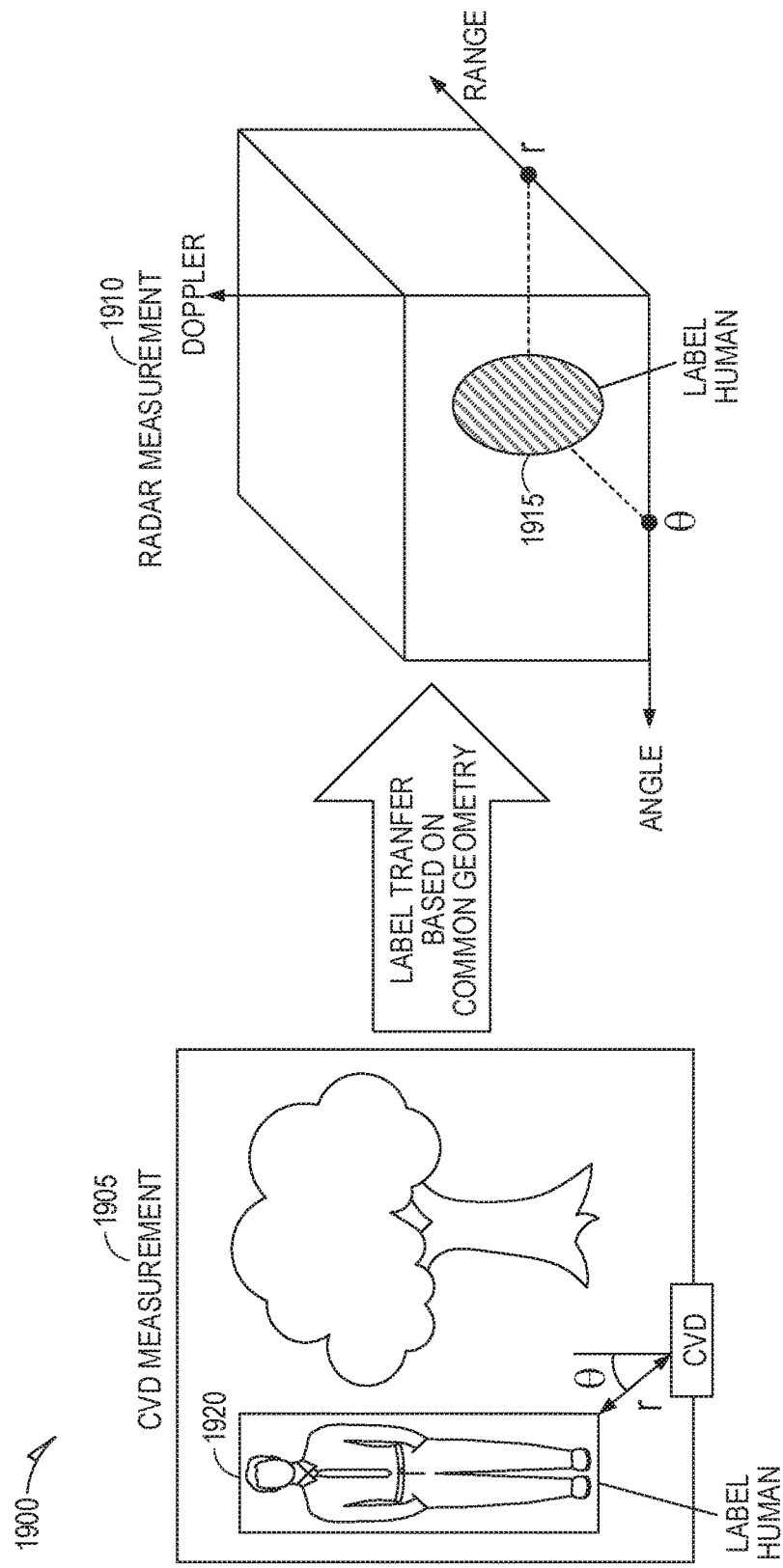
FIG. 19 illustrates an example of label transfer, in accordance with some embodiments.

FIG. 19 illustrates label transfer between the CVD measurement 1905 and the radar measurement 1910, which are geometrically co-registered. FIG. 19 (signal 1915 in the radar measurement 1910) shows the range-Doppler-angle pattern, but the micro-Doppler pattern, computed over a longer duration, is also assigned the same label.

The label information provided by the computer vision device(s) is of high quality when lighting conditions are good (e.g., daytime, clear weather). Therefore, labels from computer vision may be collected during good lighting conditions. Poor lighting conditions include night and poor weather, but the quality of vision can also be degraded in daytime conditions, such as due to shadows. Radar, on the other hand, is insensitive to lighting conditions. A machine trained in labeled radar data can therefore be used in poor lighting conditions (e.g., nighttime, fog). Thus, the disclosed radar machine learning architecture is based on a "daytime bootstrap" from computer vision.

Labels can be simple or composite. A simple label corresponds to a single object, such as a human, a car, or a dog. Composite labels can be used for multiple objects, or for describing an object in more detail. For example, "human+dog" may be the label for a human walking a dog. "Human walking" or "human running" may describe a human engaged in different activities. "Human adult" and "human child" describe different kinds of humans. "Humans, #>1" may describe more than a single human, while "Humans, #=2" may describe a specific number of humans. Computer vision systems of different levels of sophistication, as well as human intervention, can be employed to come up with such composite labels. For example, a composite label "Human, Person X" can be used to identify a particular person, either via human intervention or using a face recognition system.

Labels can be deterministic or probabilistic. A deterministic label is a single label, which may be simple or composite. A probabilistic label may assign probabilities to different possible labels for an object, for example: "dog with probability 0.7, cat with probability 0.3." Thus, a probabilistic label can be represented as a string of the form "(label(1), p(1)), (label(2), p(2)), . . . , (label(n), p(n))", where $p(1)+ \ldots +p(n)=1$", and where "label(1), . . . , label(n)" are different possible labels. When the computer vision system provides a probabilistic label, some aspects may annotate the radar data with either these probabilistic labels, or with the most probable label.

An example application of a composite label is as follows. Objects that are too close to be separated by the radar system may be separable by the computer vision system. For example, if the range-angle resolution is not sufficient, two pedestrians walking side by side may not be distinguishable by the radar system, but the vision system may be able to provide separate bounding boxes for the two. The label provided by the vision system in this case may be "two humans", which can now be used to annotate the range, angle, Doppler and micro-Doppler data. In general, the geometric registration between the radar data and the labels and bounding boxes output by the vision system may indicate that multiple objects that are not separable by the radar system correspond to a given portion of the radar data. In this case, the labels from the vision system may be aggregated. An example is illustrated in FIG. 15. Such labels enable machine learning in which the trained radar system may use range, angle, Doppler, and/or micro-Doppler to estimate the number of objects even when the objects are not separable by classical model-based radar techniques.

The label information provided by the computer vision system can be unreliable when the objects being detected are at a large distance (i.e., when they occupy a small number of pixels in the image). On the other hand, useful radar data such as range, angle, Doppler, and micro-Doppler may be available at larger target distances, as long as the transmitted power, the target radar cross section, and range are such that the radar return from the target provides a sufficient signal-to-noise ratio for estimation of the quantities of interest. In order to label radar data corresponding to targets that are too distant to be reliably processed by the computer vision system, some aspects introduce the concept of "noncausal labeling," or "inferred labeling." The radar system tracks a target in the scene, and stores the radar data corresponding to the entire track. When the target is close enough for the computer vision system to reliably classify it, the labeled output by the computer vision system is applied to the radar data collected along the entire track. This is illustrated in FIG. 16.

As an example of noncausal labeling, a car may be too far away for it to be detected and/or classified by a computer vision system, but it can be tracked by the radar system. Once the car is close enough to be detected and classified by the computer vision system, the label can be back-propagated to the radar data collected over the entire trajectory that it followed. As another example, noncausal labeling may enable a more descriptive label to be obtained. A person at a moderate distance may be classified as "human" by the computer vision system, but when the person approaches closer to the camera, facial recognition can be employed to enhance the label to "human, Person X." This more descriptive composite label can then be back-propagated for the data acquired over the entire trajectory followed by the human. As another example, at larger distances, the computer vision system might only be able to identify a subset of a number of objects in close proximity, but might be able to provide a more accurate description as the objects get closer. For example, it may detect a human walking a dog as "human" at larger distance, but then modify the label to "human+dog" as the distance decreases. The more descriptive composite label "human+dog" can then be back-propagated to the data collected at larger distances.

In general, noncausal, or inferred, labeling refers to the process of inferring more accurate or informative labels by coupling the computer vision system with a tracking module. The tracking module can be based on radar data alone, or based on multiple sensing modalities, including one or more sensors based on radar, vision and Lidar. The tracking module tracks objects (or groups of objects) in the common geographic region. In general, when a label is available for a tracked object over a segment of its trajectory, it can be extended to its entire trajectory by forward or back-propagation. When trajectories merge, labels for the trajectories are also merged.

FIG. 20 illustrates an example diagram 2000 of labeling multiple objects traveling along a trajectory, in accordance with some embodiments. As shown, the diagram 2000 includes CVDs 2005A, 2005B, 2005C, and 2005D, and radar unit 2010. The radar unit 2010 can detect signals throughout the diagram 2000. However, the CVD 2005A can detect visual signals between points A and B (and not other points along the illustrated trajectories). The CVD 2005B can detect visual signals between points C and D (and not other points along the illustrated trajectories). The CVD 2005C can detect visual signals between points E and F (and not other points along the illustrated trajectories). The CVD 2005D can detect visual signals between points G and H (and not other points along the illustrated trajectories). As shown, the CVD 2005A detects Person Alpha and Person Beta walking from point A to point B. Therefore, the computing machine accessing the data from the CVDs 2005A, 2005B, 2005C, and 2005D and the radar unit 2010 knows that the radar track associated with travel from point A to point B, and also from point B to point I, is associated with Person Alpha and Person Beta. The CVD 2005B detects Person Gamma walking from point C to point D. Therefore, the computing machine knows that the radar track associated with travel form point C to point D, and also from point D to point I, is associated with Person Gamma. Between point I and point J, the radar track from Person Alpha/Person Beta and the radar track from Person Gamma merge. Thus, the computing machine determines that the radar track from point I to point J is caused by the combination of Person Alpha, Person Beta, and Person Gamma walking together. After point J, the radar tracks separate, with some person(s) going to points E and F and some person(s) going to points G and H. After the person(s) pass point E, the CVD 2005C is able to detect that the radar track is associated with Person Beta and Person Gamma. Thus, the whole radar track of point J to point E and point E to point F is associated with the combination of Person Beta and Person Gamma. After the other person(s) pass point G, the CVD 2005D is able to detect that the radar track is associated with Person Alpha alone. Thus, the whole radar track of point J to point G and point G to point H is associated with Person Alpha alone.

As illustrated in FIG. 20, visual data (when available) may be forward- and back-propagated along radar tracks to identify object(s) traveling along the tracks. This may be referred to as "noncausal labeling." As described in FIG. 20, the computing machine is certain of the objects traveling along the radar track(s). Thus, "determinate labeling" is used. However, in some cases, the computing machine may be uncertain, and probabilistic (rather than determinate) labeling may be used, as described in greater detail below.

FIG. 20 shows an additional example of noncausal labeling. The computer vision system (including CVDs 2005A-D) provides labels when objects are at a relatively short distance from a camera (i.e., between points A and B, between points C and D, between points E and F, or between points G and H). These are then used to infer labels for trajectories at longer ranges. The computer vision system, using input from CVD 2005A, may provide the label "Humans, #=2" for the trajectory between A and B. Using input from CVD 2005B, it may provide the label "Human, #=1" for the trajectory between C and D. Using input from CVD 2005C, it may provide the label "Human, #=2" for the trajectory between E and F. Using input from CVD 2005D, it may provide the label "Human, #=1" for the trajectory between G and H. The computing machine can now infer composite labels for the entire trajectory, with labels assigned as:

B to I: "Human, #=2",
D to I: "Human, #=1",
I to J: "Human, #=3",
J to E: "Human, #=2",
J to G: "Human, #=1"

Thus, the computer vision (CV)-based label for the trajectory segment A-B is forward-propagated to provide an inferred label for the trajectory segment B-I. The CV-based label for C-D is forward-propagated to provide an inferred label for D-I. The inferred labels for B-I and D-I are then merged to provide an inferred label for I-J. The CV-based label for E-F is back-propagated to provide an inferred label for J-E, and the CV-based label for G-H is back-propagated to provide an inferred label for J-G. Inferred labels can therefore be obtained for objects that are outside the field of view of any camera in the system.

In the example of FIG. 20, it should be noted that these labels could have been inferred even if one of the four cameras were omitted. However, having redundancy in the available labels can provide additional reliability.

In one example, two objects are far from each other with two separate labels, then they get close to one another and get a compound label. In one example, an object is in the field of view of the CVD and radar unit. The object gets a label associated with it. The object later moves out of field of view of the CVD while still being detected by the radar unit. This object may keep its label, which was previously generated via the CVD. In other words, the label may be forward-propagated.

While the example in FIG. 20 has been discussed with reference to deterministic labels, these concepts apply in a straightforward manner to probabilistic labels as well. For example, if two trajectories merge, the appropriate probabilities may be merged also. In the example of FIG. 20, suppose that the inputs from CVD 2005A and CVD 2005B are employed to obtain the following labels:

A to B: Label(1)="Human,#=2", Label (2)="Human+Dog", p(1)=0.7, p(2)=0.3
C to D: Label(1)="Human,#=1", Label(2)="Human,#=2", p(1)=0.6, p(2)=0.4

Assuming statistical independence of the labels for the different segments, these labels can now be integrated to provide labels for I to J as follows:

I to J: Label(1)="Human,#=3", Label(2)="Human,#=4", Label(3)="Human,#=2; Dog, #=1", Label(4)="Human, #=3; Dog,#=1", p(1)=0.42, p(2)=0.28, p(3)=0.18, p(4)=0.12

Above, the computing machine has taken all possible combinations of labels from the two segments, and has assumed that the labels based on the inputs from the different CVDs 2005A and 2005B are statistically independent. The computing machine can simplify the probabilistic label obtained in this fashion by dropping the less likely combinations. For example, if the computing machine drops the two least likely combinations, and assigns probabilities to the remaining two based on their earlier relative probabilities, the computing machine obtains the following probabilistic label for the trajectory from I to J:

I to J: Label(1)="Human,#=3", Label(2)="Human,#=4", p(1)=0.42/(0.42+0.28)=0.6, p(2)=0.28/(0.42+0.28)=0.4

Label smoothing may be implemented. The labels output by the computer vision system may be noisy, hence the obtained labels may be averaged across several time slots along a trajectory. For a deterministic label, this may correspond to taking a majority vote (e.g., if four out of five labels are "human", and the fifth is "dog"), then we may assign the label "human" to all five time slots. If the labels are probabilistic, then the probability mass functions across time could be averaged, the least likely labels could be dropped, and the resulting probability mass function renormalized.

As noted earlier, the label provided by the computer vision system may be simple or composite, deterministic or probabilistic. In addition, other types of information estimated by the computer vision system that may be annotated to the radar data include (but are not limited to) the bounding box information (location, orientation, dimension), and semantic segmentation information. In addition to the label and the data from multiple sensors, physical properties inferred by the radar system, such as the target's absolute location, orientation, dimension, velocity, estimated distances from each of the radar units, may also be stored as metadata annotating the radar data. One or more image snapshots, or video snippets, may also be stored in order to facilitate human intervention in correcting or enhancing the labels provided by the computer vision system.

One example of enhanced labeling is to enhance the label with more specific target information. For example, a human labeler, or a more sophisticated computer vision program, may view the image snapshots or video snippets associated with the labeled data, and label it further with the identity of a specific person. Such labels can be used to train the radar machine learning system to recognize specific people using radar data alone. For example, different individuals may have differences in gait when walking, which can be captured effectively in range, angle, Doppler, and/or micro-Doppler patterns. This makes it possible to devise a machine learned system which first classifies a target as a human, and then checks whether this human is among a specific set of individuals for whom labeled data is available.

Once the radar data is labeled, it can be used to train a machine for classifying objects in addition to tracking them. Radar data is complex-valued, but it can be translated to the real domain by transformations such as the short term Fourier transform, followed by taking magnitudes. The radar data can also be directly fed into a neural network operating on complex-valued inputs (or separate magnitude and phase inputs). Since the radar data is labeled, such networks can be trained using any standard supervised learning techniques, for example, back-propagation or other supervised learning techniques.

Once a machine has been trained to receive, as input, radar data of an object and to output object labels, the machine can be employed in conjunction with target tracking to provide both trajectories and labels for objects in the field of view, as illustrated in FIG. 17. This enables the system to operate in conditions where computer vision is unreliable, such as poor lighting and bad weather. If conditions are such that computer vision also provides reliable outputs, then the computer vision outputs may be combined with the outputs of the system depicted in FIG. 17.

In some aspects, the disclosed system for gathering and labeling data comprises one or more radar units, along with one or more computer vision devices, whose location and orientation with respect to a common coordinate frame are known or can be estimated. A radar unit produces measurements of one or more of the following: range, Doppler, angle, and micro-Doppler. Objects in the field of view of the radar system are detected and localized in the common coordinate frame, and are assigned to tracks. Based on the separation between objects, and the resolution of the radar system, multiple objects may be assigned to a single track over a time period. A track comprises a sequence of locations in the common coordinate frame as a function of time, together with a set of associated radar measurements.

In some aspects, the position and velocity of an object, or multiple objects, being tracked, are estimated using any tracking algorithms, using measurements of range, Doppler and/or angle from one or more radar units. Relevant algorithms may include Kalman filter, unscented Kalman filter, extended Kalman filter, particle filter, interacting multiple models, multiple hypothesis tracking. Probabilistic data association between measurements and tracks are also performed using standard techniques. Position and velocity estimation involves a summary of radar measurements, such as a single range, Doppler or angle estimate associated with measurements in a given frame from a given unit. However, for the purpose of radar machine learning, a richer set of data is associated with each frame of a track. Range and Doppler measurements in a window around the position and velocity estimated by the standard tracker are stored for each frame. Micro-Doppler estimates might, in some cases, include measurements over a longer time period, in order to provide the frequency resolution required to capture fine-grained patterns.

Figure 21:
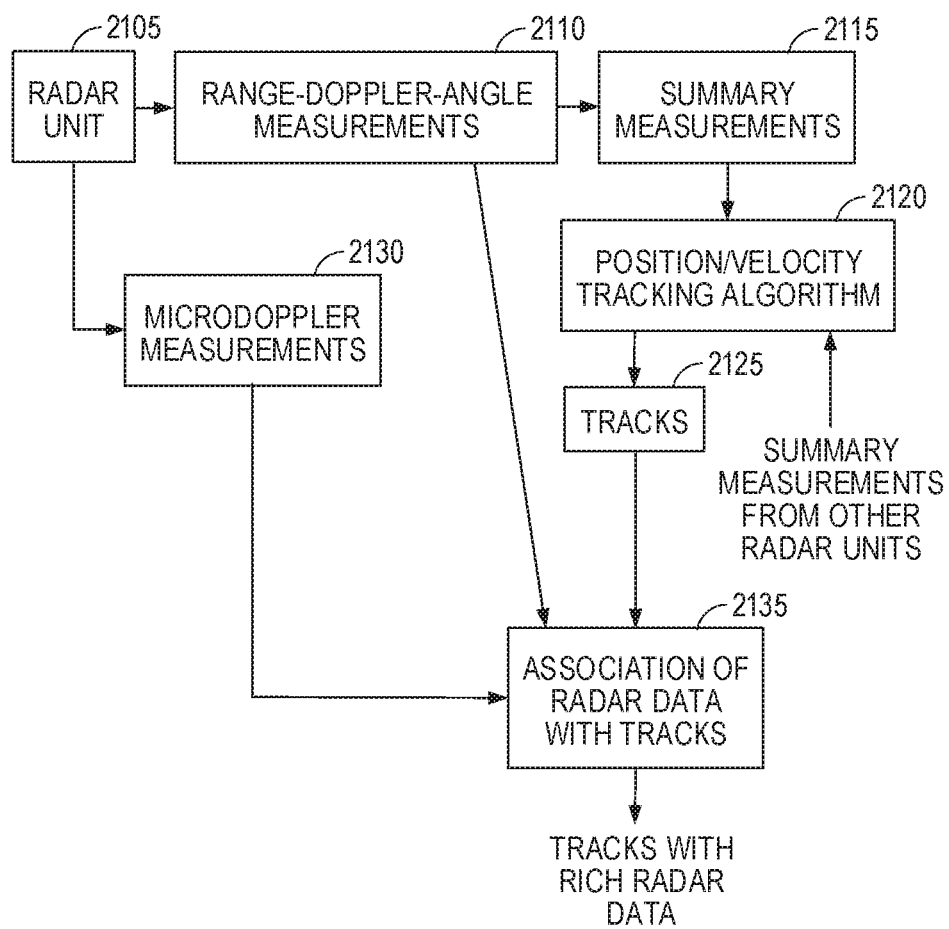
FIG. 21 illustrates an example radar data collection architecture.

FIG. 21 illustrates an example radar data collection architecture 2100. As shown, a radar unit 2105 generates range-Doppler-angle measurements 2110. These are converted to summary measurements 2115, which are provided to a position/velocity tracking algorithm 2120. The standard position/velocity tracking algorithm 2120 also receives summary measurements from other radar units different from the radar unit 2105. The position/velocity tracking algorithm 2120 outputs radar tracks 2125. The radar unit 2105 also generates micro-Doppler measurements 2130. The association of radar data with tracks module 2135 associates tracks 2125 with radar data (range-Doppler-angle measurements 2110 and micro-Doppler measurements 2130). The association of radar data with tracks module 2135 outputs tracks with rich radar data.

FIG. 21 shows how a rich set of radar measurements is associated with tracks obtained using tracking techniques. The location and spatial extent of the target corresponding to a track is represented by a posterior distribution by the position/velocity tracking algorithm 2120. For example, the posterior distribution may be a Gaussian, or mixture Gaussian, distribution. This provides a gating function that is used to associate a rich set of radar data with the track. This includes range-Doppler-angle measurements 2110 within the gating function. Micro-Doppler measurements 2130 may be gathered over a longer time period than the frame interval used for tracking, and are obtained by concatenating range-angle gated observations over multiple frames.

Figure 22:
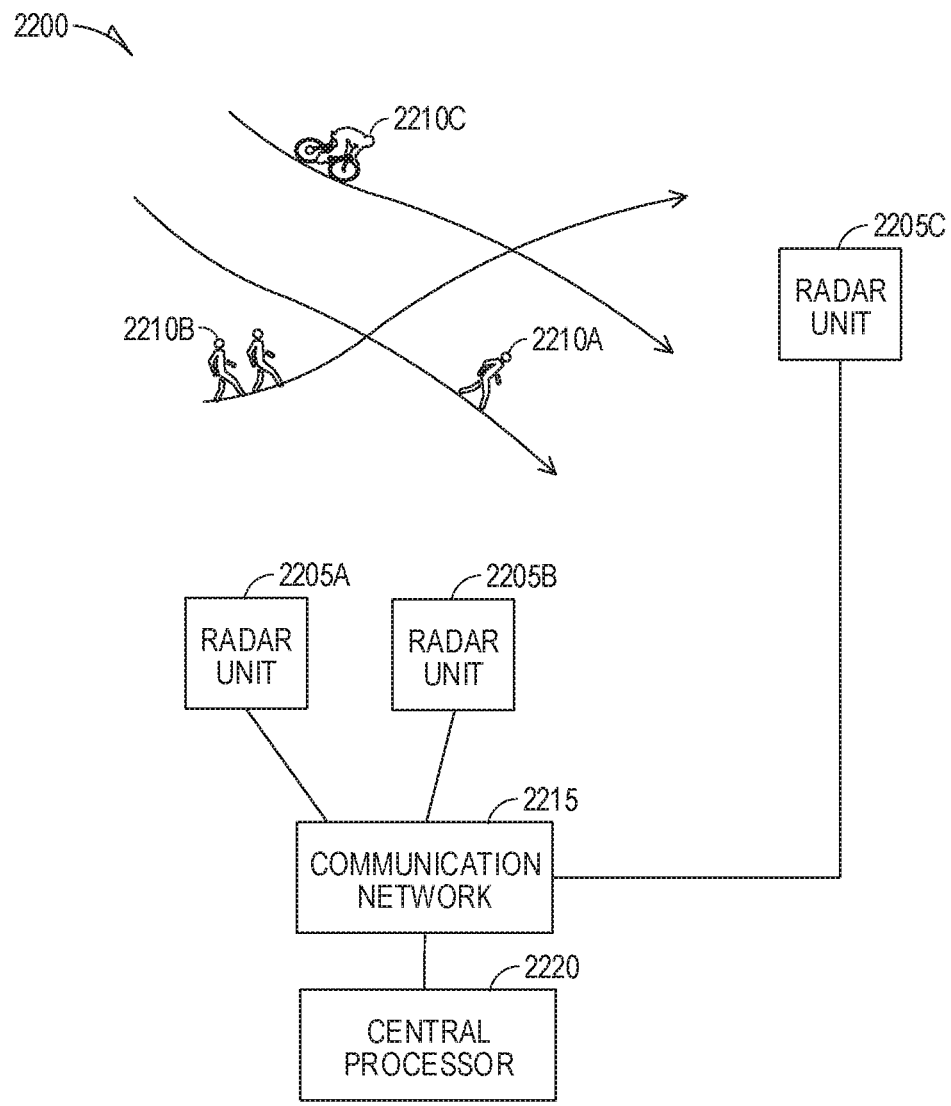
FIG. 22 illustrates an example observation system with multiple radar units.

An example deployment of multiple radar units, with multiple tracks being produced, is depicted in FIG. 22. As shown in FIG. 22, a single track may correspond to multiple objects.

FIG. 22 illustrates an example observation system 2200 with multiple radar units. As shown, three radar units 2205A, 2205B, and 2205C observe three tracks 2210A, 2210B, and 2210C. Track 2210A includes one person walking. Track 2210B includes two people walking. Track 2210C includes a person riding a bicycle. The data representing the tracks 2210A, 2210B, and 2210C is observed by the radar units 2205A, 2205B, and 2205C. The radar units 2205A, 2205B, and 2205C provide the data, via a communication network 2215, to a central processor 2220. At the central processor 2220, the data is processed using the techniques described herein.

Some aspects of the technology disclosed herein are described below as examples. These examples do not limit the technology disclosed herein.

Example 1 is a system comprising: processing circuitry; and a memory storing instructions which, when executed by the processing circuitry, cause the processing circuitry to perform operations comprising: accessing data from one or more radar units, the data from the one or more radar units comprising radar tracks, each radar track comprising one or more Doppler measurements, one or more range measurements, and one or more angle measurements; accessing data from one or more computer vision devices, the data from the one or more computer vision devices comprising one or more images, the data from the one or more computer vision devices being associated with a common geographic region and a common time period with the data from the one or more radar units; labeling, using an image recognition module, objects in the one or more images from the one or more computer vision devices; determining, based on the common geographic region and the common time period, that one or more labeled objects in the one or more images map to one or more radar tracks; labeling the one or more radar tracks based on labels of the labeled objects; and providing, as a digital transmission, the one or more labeled radar tracks.

In Example 2, the subject matter of Example 1 includes, the operations further comprising: training, using the one or more labeled radar tracks, a radar machine learning module to recognize objects in radar tracks.

In Example 3, the subject matter of Examples 1-2 includes, wherein the data from the one or more computer vision devices being associated with the common geographic region and the common time period with the data from the one or more radar units comprises the data from the one or more computer vision devices being associated with an overlapping geographic region and an overlapping time period with the data from the one or more radar units.

In Example 4, the subject matter of Examples 1-3 includes, wherein the data from the one or more computer vision devices being associated with the common geographic region and the common time period with the data from the one or more radar units comprises the data from the one or more computer vision devices being within a threshold amount of time and a threshold distance from the data from the one or more radar units.

In Example 5, the subject matter of Examples 1-4 includes, wherein at least a portion of the radar tracks comprise a micro-Doppler measurement, and wherein the micro-Doppler measurement is generated over a longer time period than the one or more Doppler measurements, the one or more range measurements, or the one or more angle measurements.

In Example 5A, the subject matter of Example 5 includes the operations further comprising:
generating rich radar data tracks by coupling the micro-Doppler measurements with radar tracks generated using the one or more Doppler measurements, the one or more range measurements, or the one or more angle measurements.

In Example 5B, the subject matter of Example 5A includes, wherein the one or more labeled radar tracks comprise rich radar data tracks.

In Example 6, the subject matter of Examples 1-5 includes, wherein determining whether the one or more labeled objects in the one or more images map to the one or more radar tracks comprises: determining that the one or more labeled objects moved from a first geographic position at a first time moment associated with the one or more radar tracks to a second geographic position at a second time moment associated with the one or more images.

In Example 7, the subject matter of Example 6 includes, the operations further comprising: propagating a label of the one or more labeled objects associated with the second geographic position at the second time moment to the one or more radar tracks at the first geographic position at the first time moment, wherein propagating comprises back-propagating or forward-propagating.

In Example 8, the subject matter of Example 7 includes, wherein the digital transmission comprises the propagated label.

In Example 9, the subject matter of Examples 1-8 includes, wherein labeling the objects in the one or more images comprises: determining, at a first time, that two or more objects correspond to a single radar track based on a geographic position of the single radar track and geographic positions of the two or more objects; and providing a single label for the two or more objects based on the two or more objects corresponding to the single radar track.

In Example 10, the subject matter of Example 9 includes, wherein the digital transmission comprises the single label.

In Example 11, the subject matter of Examples 9-10 includes, wherein the one or more radar units are unable to distinguish between signals from a first object and a second object, wherein the one or more computer vision devices is able to distinguish between the first object and the second object, wherein the first object and the second object are both from among the two or more objects, wherein the one or more radar units track the two or more objects over time.

In Example 12, the subject matter of Example 11 includes the operations further comprising: detecting, at a second time different from the first time, that the first object and the second object correspond to two distinct radar tracks; assigning two separate labels to the first object and the second object; and propagating the assigned two separate labels to distinguish between a radar track of the first object and a radar track of the second object.

In Example 13, the subject matter of Example 12 includes, wherein either: (i) the second time is later than the first time and the propagating comprises back-propagating or (ii) the second time is earlier than the first time and the propagating comprises forward-propagating.

In Example 14, the subject matter of Examples 1-13 includes D spherical coordinates.

In Example 15, the subject matter of Examples 1-14 includes the one or more radar units; and the one or more computer vision devices.

In Example 16, the subject matter of Example 15 includes, wherein the one or more radar units observe a first geographic area, wherein the one or more computer vision devices observe a second geographic area, and wherein the first geographic area intersects with the second geographic area.

In Example 17, the subject matter of Examples 1-16 includes, wherein labeling the one or more radar measurements comprises: assigning a single deterministic label to a single object corresponding to the radar measurements.

In Example 18, the subject matter of Examples 1-17 includes, wherein labeling the one or more radar measurements comprises: assigning a single deterministic label to a combination of two or more objects corresponding to the radar measurements.

In Example 19, the subject matter of Examples 1-18 includes, wherein labeling the one or more radar measurements comprises: assigning, to a single object or a combination of two or more objects corresponding to the radar measurements, a combination of two or more labels, each of the two or more labels having an associated probability value.

In Example 20, the subject matter of Examples 1-19 includes, wherein labeling the one or more radar measurements comprises: applying label smoothing or label correction based on a path of an object detected by the one or more computer vision devices and the one or more radar units, wherein the label smoothing or the label correction averages labels across the path.

Example 21 is a non-transitory machine-readable medium storing instructions which, when executed by the processing circuitry, cause the processing circuitry to perform operations comprising: accessing data from one or more radar units, the data from the one or more radar units comprising radar tracks, each radar track comprising one or more Doppler measurements, one or more range measurements, and one or more angle measurements; accessing data from one or more computer vision devices, the data from the one or more computer vision devices comprising one or more images, the data from the one or more computer vision devices being associated with a common geographic region and a common time period with the data from the one or more radar units; labeling, using an image recognition module, objects in the one or more images from the one or more computer vision devices; determining, based on the common geographic region and the common time period, that one or more labeled objects in the one or more images map to one or more radar tracks; labeling the one or more radar tracks based on labels of the labeled objects; and providing, as a digital transmission, the one or more labeled radar tracks.

In Example 22, the subject matter of Example 21 includes the operations further comprising: training, using the one or more labeled radar tracks, a radar machine learning module to recognize objects in radar tracks.

In Example 23, the subject matter of Examples 21-22 includes, wherein the data from the one or more computer vision devices being associated with the common geographic region and the common time period with the data from the one or more radar units comprises the data from the one or more computer vision devices being associated with an overlapping geographic region and an overlapping time period with the data from the one or more radar units.

Example 24 is a method implemented at one or more computing machines, the method comprising: accessing data from one or more radar units, the data from the one or more radar units comprising radar tracks, each radar track comprising one or more Doppler measurements, one or more range measurements, and one or more angle measurements; accessing data from one or more computer vision devices, the data from the one or more computer vision devices comprising one or more images, the data from the one or more computer vision devices being associated with a common geographic region and a common time period with the data from the one or more radar units; labeling, using an image recognition module, objects in the one or more images from the one or more computer vision devices; determining, based on the common geographic region and the common time period, that one or more labeled objects in the one or more images map to one or more radar tracks; labeling the one or more radar tracks based on labels of the labeled objects; and providing, as a digital transmission, the one or more labeled radar tracks.

Example 25 is a system comprising: processing circuitry; and a memory storing instructions which, when executed by the processing circuitry, cause the processing circuitry to perform operations comprising: accessing data from one or more radar units, the data from the one or more radar units comprising radar tracks, each radar track comprising one or more Doppler measurements, one or more range measurements, and one or more angle measurements; determining, using a machine learning-trained module, a label representing one or more objects in the accessed data from the one or more radar units, wherein the machine learning-trained module is trained based on a dataset of labeled radar tracks; and providing, as a digital transmission, the determined label.

In Example 26, the subject matter of Example 25 includes, wherein the dataset of labeled radar tracks is labeled based on labels of images, wherein the images and the labeled radar tracks are associated with a common geographic region and a common time period.

In Example 27, the subject matter of Examples 25-26 includes, wherein the determined label is a single label that corresponds to a single radar track and multiple objects.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   processing circuitry; and
   a memory storing instructions which, when executed by the processing circuitry, cause the processing circuitry to perform operations comprising:
   accessing data from one or more radar units, the data from the one or more radar units comprising radar tracks, each radar track comprising one or more Doppler measurements, one or more range measurements, and one or more angle measurements;
   accessing data from one or more computer vision devices, the data from the one or more computer vision devices comprising one or more images, the data from the one or more computer vision devices being associated with a common geographic region and a common time period with the data from the one or more radar units, wherein the one or more computer vision devices comprise one or more cameras;
   labeling, using an image recognition engine, objects in the one or more images from the one or more computer vision devices;
   determining, based on the common geographic region and the common time period, that one or more labeled objects in the one or more images map to one or more radar tracks;
   labeling the one or more radar tracks based on labels of the labeled objects; and
   providing, as a digital transmission, the one or more labeled radar tracks.

2. The system of claim 1, the operations further comprising:
   training, using the one or more labeled radar tracks, a radar machine learning engine to recognize objects in radar tracks.

3. The system of claim 1, wherein the data from the one or more computer vision devices being associated with the common geographic region and the common time period with the data from the one or more radar units comprises the data from the one or more computer vision devices being associated with an overlapping geographic region and an overlapping time period with the data from the one or more radar units.

4. The system of claim 1, wherein the data from the one or more computer vision devices being associated with the common geographic region and the common time period with the data from the one or more radar units comprises the data from the one or more computer vision devices being within a threshold amount of time and a threshold distance from the data from the one or more radar units.

5. The system of claim 1, wherein at least a portion of the radar tracks comprise a micro-Doppler measurement, and wherein the micro-Doppler measurement is generated over a longer time period than the one or more Doppler measurements, the one or more range measurements, or the one or more angle measurements.

6. The system of claim 5, the operations further comprising:
generating rich radar data tracks by coupling the micro-Doppler measurements with radar tracks generated using the one or more Doppler measurements, the one or more range measurements, or the one or more angle measurements.

7. The system of claim 6, wherein the one or more labeled radar tracks comprise rich radar data tracks.

8. The system of claim 1, wherein determining that the one or more labeled objects in the one or more images map to the one or more radar tracks comprises:
determining that the one or more labeled objects moved from a first geographic position at a first time moment associated with the one or more radar tracks to a second geographic position at a second time moment associated with the one or more images.

9. The system of claim 8, the operations further comprising:
propagating a label of the one or more labeled objects associated with the second geographic position at the second time moment to the one or more radar tracks at the first geographic position at the first time moment, wherein propagating comprises back-propagating or forward-propagating.

10. The system of claim 9, wherein the digital transmission comprises the propagated label.

11. The system of claim 1, wherein labeling the objects in the one or more images comprises:
determining, at a first time, that two or more objects correspond to a single radar track based on a geographic position of the single radar track and geographic positions of the two or more objects; and
providing a single label for the two or more objects based on the two or more objects corresponding to the single radar track.

12. The system of claim 11, wherein the digital transmission comprises the single label.

13. The system of claim 11, wherein the one or more radar units are unable to distinguish between signals from a first object and a second object, wherein the one or more computer vision devices is able to distinguish between the first object and the second object, wherein the first object and the second object are both from among the two or more objects, wherein the one or more radar units track the two or more objects over time.

14. The system of claim 13, the operations further comprising:
detecting, at a second time different from the first time that the first object and the second object correspond to two distinct radar tracks;
assigning two separate labels to the first object and the second object; and
propagating the assigned two separate labels to distinguish between a radar track of the first object and a radar track of the second object.

15. The system of claim 1, wherein the one or more Doppler measurements are in three dimensions (3D), the one or more range measurements are in 3D, and the one or more angle measurements correspond to 3D spherical coordinates.

16. The system of claim 1, further comprising:
the one or more radar units; and
the one or more computer vision devices.

17. The system of claim 16, wherein the one or more radar units observe a first geographic area, wherein the one or more computer vision devices observe a second geographic area, and wherein the first geographic area intersects with the second geographic area.

18. A system comprising:
processing circuitry; and
a memory storing instructions which, when executed by the processing circuitry, cause the processing circuitry to perform operations comprising:
accessing data from one or more radar units, the data from the one or more radar units comprising radar tracks, each radar track comprising one or more Doppler measurements, one or more range measurements, and one or more angle measurements;
determining, using a machine learning-trained engine, a label representing one or more objects in the accessed data from the one or more radar units, wherein the machine learning-trained engine is trained based on a dataset of labeled radar tracks, wherein the dataset of labeled radar tracks is generated using one or more cameras, and wherein the label represents a classification of the one or more objects; and
providing, as a digital transmission, the determined label.

19. The system of claim 18, wherein the dataset of labeled radar tracks is labeled based on labels of images, wherein the images and the labeled radar tracks are associated with a common geographic region and a common time period.

20. The system of claim 18, wherein the determined label is a single label that corresponds to a single radar track and multiple objects.

* * * * *